(12) United States Patent
Boughtwood

(10) Patent No.: US 12,132,365 B2
(45) Date of Patent: Oct. 29, 2024

(54) MOTOR/GENERATOR

(71) Applicants:DEREGALLERA HOLDINGS LTD, Mid Glamorgan (GB); Martin Hugh Boughtwood, Mid Glamorgan (GB)

(72) Inventor: Martin Hugh Boughtwood, Mid Glamorgan (GB)

(73) Assignee: DEREGALLERA HOLDINGS LTD (GB)

( * ) Notice: Subject to any disclaimer, the term of this patent is extended or adjusted under 35 U.S.C. 154(b) by 180 days.

(21) Appl. No.: 17/796,562

(22) PCT Filed: Feb. 4, 2021

(86) PCT No.: PCT/EP2021/052699
§ 371 (c)(1),
(2) Date: Jul. 29, 2022

(87) PCT Pub. No.: WO2021/156383
PCT Pub. Date: Aug. 12, 2021

(65) Prior Publication Data
US 2023/0052512 A1    Feb. 16, 2023

(30) Foreign Application Priority Data
Feb. 7, 2020  (GB) .................................. 2001714

(51) Int. Cl.
*H02K 21/44*    (2006.01)
*H02K 1/14*     (2006.01)
(Continued)

(52) U.S. Cl.
CPC ............. *H02K 21/44* (2013.01); *H02K 1/141* (2013.01); *H02K 1/148* (2013.01); *H02K 1/17* (2013.01); *H02K 21/04* (2013.01); *H02K 41/033* (2013.01)

(58) Field of Classification Search
CPC .......... H02K 1/141; H02K 1/148; H02K 1/17; H02K 21/00; H02K 21/04; H02K 21/44;
(Continued)

(56) References Cited

U.S. PATENT DOCUMENTS

| 4,479,103 A | 10/1984 | Bailey et al. | |
| 2002/0175580 A1* | 11/2002 | Ogino | H02K 47/00 310/152 |
| 2008/0272664 A1* | 11/2008 | Flynn | H02K 21/44 310/154.01 |

FOREIGN PATENT DOCUMENTS

| CN | 107026518 A | 8/2017 |
| CN | 107276350 A | 10/2017 |

(Continued)

OTHER PUBLICATIONS

JP-2016032384-A, Asano et al, all pages (Year: 2016).*
(Continued)

*Primary Examiner* — Naishadh N Desai
(74) *Attorney, Agent, or Firm* — BKRIP LLC

(57) ABSTRACT

Apparatus (200) for use as a motor or generator, comprising: a first part (210); a second part (230) movable relative to the first part (210) and spaced from the first part (210) by an air gap (260); and a plurality of spaced activatable magnet elements (220) provided on the first part (210), each activatable magnet element (220) being operative when activated by application of an electric current thereto to direct a magnetic field across the air gap (260) towards the second part (230); wherein each activatable magnet element (220) comprises: a pole piece (222) defining an air-gap facing surface (223A, 223B), the pole piece (222) comprising: a first limb (224A); a second limb (224B); and a coil-winding section (224C) positioned between the first and second limbs (224A, 224B); a permanent magnet arrangement (225) provided between the first and second limbs 224A, 224B) of the (Continued)

pole piece; and an electrically conductive coil (226) wound around the coil-winding section (224C) of the pole piece, wherein the electrically conductive coil (226) is operative to generate a magnetic flux oriented to oppose the magnetic flux of the permanent magnet arrangement (225); characterised in that the pole piece (222) further comprises a parallel flux path section (224D) extending in parallel to the coil-winding section (224C) operative to allow magnetic flux from the permanent magnet arrangement (225) to flow in parallel to the coil-winding section (224C).

21 Claims, 17 Drawing Sheets

(51) Int. Cl.
  *H02K 1/17* (2006.01)
  *H02K 21/04* (2006.01)
  *H02K 41/03* (2006.01)
(58) Field of Classification Search
  CPC .. H02K 41/03; H02K 41/033; Y10S 521/906; Y10S 521/907; B27K 2240/30; B27K 3/15; D06M 13/292; D06M 13/295; H04B 10/70; H04B 10/85; G06F 21/602; G06F 21/606; H04J 14/02; H04L 63/061; H04L 63/1475; H04L 63/166; H04L 9/0852; H04L 63/1408; H04L 9/0825; H04L 9/0858

See application file for complete search history.

(56) References Cited

FOREIGN PATENT DOCUMENTS

| | | | |
|---|---|---|---|
| DE | 102013201861 B3 | 7/2014 | |
| EP | 2002529 A1 | 12/2008 | |
| EP | 2002529 B1 * | 5/2011 | ............... C23C 4/04 |
| GB | 2454171 A * | 5/2009 | ............ H02K 1/246 |
| JP | 2016032384 A * | 3/2016 | |
| WO | 2006128231 A1 | 12/2006 | |
| WO | 2007101876 A1 | 9/2007 | |

OTHER PUBLICATIONS

EP-2002529-B1, Gabsi, all pages (Year: 2011).*
GB-2454171-A, Pollock et al. all pages (Year: 2009).*
PCT Application No. PCT/EP2021/052699, International Search Report and Written Opinion, mailed May 3, 2021, 16 pp.

* cited by examiner

MOTOR/GENERATOR

The present invention relates to apparatus for use as a motor or generator, particularly but not exclusively to high-power-density motor/generators.

It is well known in the art to provide permanent magnet motor/generator machines with permanent magnets fitted to the rotor and the permanent magnet circuits of the machine provided in magnetic series with the activatable electromagnet circuits provided on the stator. However, an alternative approach is to avoid the use of permanent magnets on the rotor and instead rely upon inducing magnetic flux flow through a ferromagnetic rotor. This type of motor is commonly referred to as a reluctance motor since torque is generated through magnetic reluctance as the rotor moves to attempt to minimise reluctance between the rotor and stator.

FIGS. 1A and 1B illustrate an example of a reluctance motor/generator 100 based on a concept known in the art comprising: a stator 110 and a rotor 130 movable relative to the stator 110 in direction "D" and spaced therefrom by an active air gap 160. Stator 110 includes a plurality of activatable magnet elements 120 and rotor 130 includes a plurality of magnetic flux guide elements 140 (for simplicity only a single activatable magnet element and a single magnet flux guide element are shown). Each activatable magnet element 120 is operative when activated by application of an electric current thereto to direct a magnetic field across the air gap 160 to an opposed magnetic flux guide element 140.

Each activatable magnet element 120 comprises: a high permeability pole piece 122 defining a pair of air-gap facing surfaces 123A, 123B, the pole piece 122 comprising: a first limb 124A; a second limb 124B; and a coil-winding section 124C positioned between the first and second limbs 124A, 124B; a permanent magnet 125 (in this case a single permanent magnet) provided between the first and second limbs 124A, 124B and magnetically in parallel to the coil-winding section 124C; and an electrically conductive coil 126 wound around the coil-winding section 124C of the pole piece 122, wherein the electrically conductive coil 126 is operative to generate a magnetic flux oriented to oppose the magnetic flux of the permanent magnet 125.

As illustrated in FIG. 1A, in an inactive mode of operation, the electrically conductive coil 126 is de-energised and magnetic flux ($F_{PM}$) from the permanent magnet 125 will preferentially flow in an anti-clockwise direction through the first limb 124A and coil-winding section 124C in preference to across the air gap 160 as the reluctance of the path through the pole piece 122 is lower than the reluctance of the path across the air gap 160.

As illustrated in FIG. 1B, in an active mode of operation the electrically conductive coil 126 is energised to generate a magnetic flux ($F_C$) to oppose the magnetic flux ($F_{PM}$) of the permanent magnet 125. As the magnetomotive force (mmf) is increased, the flow of magnetic flux from the permanent magnet 125 will reverse and the magnetic fluxes from the electrically conductive coil 126 and from the permanent magnet 125 will combine in the clockwise direction and preferentially flow along first limb 124A and across the air gap 160 as the permanent magnet 125 reluctance across the air gap 160 is now lower than the path through the pole piece 122 with the opposed coil flux present. This magnetic flux across the air gap 160 flows through the magnetic flux guide element 140 and back across the airgap and along second limb 124B to complete the magnetic circuit. If the activatable magnet element 120 and magnetic flux guide element 140 are initially offset, the magnetic flux guide element 140 will attempt to align with the activatable magnet element 120 in order to minimise reluctance of the system resulting in relative motion between the rotor 130 and stator 110. The motion can be continued by selective deactivation of the activatable magnet element 120 and activation of a next activatable magnet element that is offset from a next magnetic flux guide element.

The present applicant has identified an improved motor/generator design that provides an enhanced performance over the prior art.

In accordance with the present invention, there is provided apparatus for use as a motor or generator, comprising: a first part; a second part movable relative to the first part and spaced from the first part by an air gap; and a plurality of spaced activatable magnet elements provided on the first part, each activatable magnet element being operative when activated by application of an electric current thereto to direct a magnetic field across the air gap towards (e.g. a localised region of) the second part; wherein each activatable magnet element comprises: a pole piece defining an air-gap facing surface, the pole piece comprising: a first limb; a second limb; and a coil-winding section positioned between the first and second limbs; a permanent magnet arrangement provided between the first and second limbs of the pole piece; and an electrically conductive coil wound around the coil-winding section of the pole piece, wherein the electrically conductive coil is operative to generate a magnetic flux oriented to oppose the magnetic flux of the permanent magnet arrangement.

In accordance with one embodiment of the invention, the apparatus is characterised in that the pole piece further comprises a parallel flux path section extending in parallel (magnetically in parallel) to the coil-winding section operative to allow magnetic flux from the permanent magnet arrangement to flow in parallel (e.g. locally in parallel) to the coil-winding section.

In this way, a reluctance motor/generator apparatus is provided in which the magnetic flux of a permanent magnet may be selectively switched on and off across the air gap using an electrically conductive coil with a reduced mean turn length than would be necessary if the cross-section of the coil-winding section was sized to accept all of the magnetic flux from the permanent magnet. Advantageously, the use of a reduced mean turn length coil offers a reduction in heat loss through the coil with a corresponding reduction in the mass and volume of the coil together with a reduction in heat loss handling requirements for the apparatus. Furthermore, the magnetic flux generated by the electrically conductive coil is applied locally to the activatable magnet element and circulates back to the coil via the parallel flux path section, thereby avoiding the need to transmit electromagnetically-generated flux across any air gap or between neighbouring activatable magnet elements. Furthermore, the invention also benefits from the absence of any magnet or cogging torque whilst the electrically conductive coils are de-energised—thus, unlike a conventional magnetic machine, the apparatus of the present invention generates minimal resistance to rotation/high voltages when running de-energised. The apparatus may be used in any application in which energy is converted between electrical energy and kinetic energy and vice versa including use as a motor, generator or sensor/detector transducer.

In an inactive mode of operation the electrically conductive coil is de-energised and magnetic flux from the permanent magnet arrangement will preferentially flow in parallel through the coil-winding section and parallel flux path section in preference to across the air gap.

In an active mode of operation the electrically conductive coil is energised to generate a magnetic flux (e.g. circulating via the parallel flux path) to oppose the magnetic flux of the permanent magnet arrangement and the magnetic flux from the permanent magnet arrangement will preferentially flow across the air gap.

Typically the pole piece is formed from a high permeability (relative to air)/"soft magnetic" material (e.g. non-permanently magnetisable/magnetically conductive material such as a ferromagnetic material). Typically the regions of high permeability material will have a permeability at least 100 times greater than that of air (e.g. at least 500 times greater, e.g. at least 1000 times greater).

Typically the coil-winding section and parallel flux path sections are intended to provide minimal reluctance. Ideally both the coil-winding section and parallel flux path are therefore substantially permanent-magnet free (i.e. no part of the permanent magnet arrangement extends into either of these sections. The presence of a permanent magnet (even if very small) would only serve to increase the magnetic flux required to be handled by the coil-winding and parallel flux path sections and consequentially undesirably increase the coil power requirements.

Typically, each of the coil-winding section and the parallel flux path section extend (e.g. extend fully) between the first and second limbs (i.e. the coil-winding section and the parallel flux path section are provided in parallel between the first and second limbs).

In one embodiment, the permanent magnet arrangement is provided in parallel (magnetically in parallel) to the coil-winding section.

In one embodiment, the coil-winding section is positioned between the permanent magnet arrangement and the parallel flux path section. In another embodiment, the parallel flux path section is positioned between the permanent magnet arrangement and the coil-winding section.

In one embodiment, the parallel flux path section comprises a further coil-winding section and the activatable magnet element further comprises a further electrically conductive coil wound around the further coil-winding section.

In one embodiment, the further electrically conductive coil is operative to generate a magnetic flux in the same flow direction as the magnetic flux generated by the first-defined electrically conductive coil (such that the flux flowing from the first-defined electrically conductive coil and the further electrically conductive coil will combine additively). In this way, power handling is shared between the first-defined and further electrically conductive coils and the size of the first-defined electrically conductive coil may be reduced. In this arrangement, the coil-winding and parallel flux path sections essentially function identically within the pole piece.

In the inactive mode of operation both the electrically conductive coil and the further electrically conductive coil are de-energised and magnetic flux from the permanent magnet arrangement will preferentially flow in parallel through the coil-winding section and parallel flux path section in preference to across the air gap.

In an active mode of operation one or more of (e.g. both) the electrically conductive coil and the further electrically conductive coil are energised (e.g. both fully energised) to generate a magnetic flux to oppose the magnetic flux of the permanent magnet arrangement and the magnetic flux from the permanent magnet arrangement will preferentially flow across the air gap.

In one embodiment, the first-defined electrically conductive coil and the further electrically conductive coil are connected electrically in series (e.g. with winding direction and current flow direction aligned to ensure the flux flow from each coil is in the same directional sense such that the flux flows will combine additively during the active mode).

In one group of embodiments (restricted flux flow embodiments), the pole piece (e.g. first limb of the pole piece) has a flux flow restriction region operative to control the flow of magnetic flux from the permanent magnet to the coil-winding section/parallel flux path section.

In a first embodiment, the flux flow restriction region may comprise a tapered region provided between the permanent magnet arrangement and the coil-winding section/parallel flux path section. In this way, if the pole piece is operating close to magnetic saturation during the active mode then any magnetic flux attempting to flow along the first limb towards the coil-winding section/parallel flux path section will lead to magnetic saturation of the restriction region of the first limb. This partial magnetic saturation will increase the reluctance of the pole piece (a saturated core has a reluctance akin to the air gap) and encourage preferential magnetic flux flow across the air gap. In one embodiment, the tapered region comprising a first section that reduces (e.g. gradually reduces) in cross-sectional area and a second section that increases (e.g. gradually increases) in cross-sectional area.

In a second embodiment, the pole piece (e.g. first limb of the pole piece) may comprise at least one reduced permeability region, the reduced permeability region having a substantially reduced permeability relative to an average (e.g. mean) permeability of the pole piece, wherein the at least one reduced permeability region is positioned such that magnetic flux flowing from the permanent magnet arrangement (e.g. plurality of mutually spaced permanent magnets) to the coil-winding section flows through the at least one reduced permeability region.

Advantageously, the provision of the at least one reduced permeability region may be especially advantageous where the permanent magnet arrangement comprises a plurality of permanent magnets since it will act to reduce the instantaneous mmf of the electrically conductive coil is required to develop each time the electrically conductive coil is energised.

In one embodiment, the region of reduced permeability is configured to receive substantially the full flow of magnetic flux flowing from the permanent magnet arrangement to the coil section (e.g. full flow of magnetic flux flowing from the permanent magnet arrangement to the coil section and parallel flux path section).

In one embodiment, the region of reduced permeability has a permeability at least 100 times lower than the average (e.g. mean) permeability of the pole piece (e.g. at least 500 times lower than the average (e.g. mean) permeability of the pole piece, e.g. approximately 1000 times lower than the average (e.g. mean) permeability of the pole piece). Typically the low permeability region is no less than the airgap permeability and more typically greater than the airgap permeability by a factor of 2 or more.

In one embodiment, the region of reduced permeability is electrically insulative (e.g. to avoid the formation of eddy currents therein).

In one embodiment, the second part is movable relative to the first part along a predetermined path of travel.

In one embodiment, the second part comprises a plurality of spaced magnetic flux guide regions (e.g. a plurality of magnetically influenceable/non-permanently magnetisable regions spaced along the predetermined path of travel).

Typically the magnetic flux guide regions comprise regions of a high permeability (relative to air)/"soft magnetic" material (e.g. non-permanently magnetisable/magnetically conductive material such as a ferromagnetic material). Typically the regions of high permeability material will have a permeability at least 100 times greater than that of air (e.g. at least 500 times greater, e.g. at least 1000 times greater).

During the active mode of operation, the magnetic flux crossing the air gap will pass through a nearest one of the magnetic flux guide regions before returning across the air gap. The second part will experience an aligning force as a result of the permanent magnet flux crossing the airgap as the apparatus attempts to force a reduction in reluctance by bringing the second part into alignment with the first part. However, as soon as the electrically conductive coil is de-energised the magnetic flux flow across the air gap stops and the alignment force ceases.

In one embodiment, the number of magnetic flux guide regions is close to the number of activatable magnet elements. In one embodiment, the number of magnetic flux guide regions differs from the number of electromagnet elements by +/−2, 3, 4, 6, 8, 9, 10 or 12.

In one embodiment, the air gap extends in multiple planes and the pole piece defines an air-gap facing surface extending along the multiple planes.

In one embodiment, the first limb defines a first air-gap facing surface.

In one embodiment, the second limb defines a second air-gap facing surface.

In one embodiment, the permanent magnet arrangement defines a third air-gap facing surface (e.g. provided between the first and second air-gap facing surface).

In a first set of embodiments (single air-gap embodiments), the air gap is a single air gap and the first and second limbs define first and second magnetic flux paths respectively each extending from the coil-winding section towards the single air gap. For example, in the case that the first and second limbs define first and second air-gap facing surfaces, each of the first and second air-gap facing surfaces may face the single air gap (e.g. with the first and second air-gap facing surfaces facing spaced regions of the single air gap).

In the inactive mode, magnetic flux from the permanent magnet arrangement of the activatable magnet element flows through the first limb, through the parallel coil-winding and parallel flux path sections and then through the second limb (e.g. and returns to the permanent magnet arrangement).

In the active mode, magnetic flux generated by the energised electrically conductive coil in opposition to the magnetic flux of the permanent magnet arrangement causes the magnetic flux of the permanent magnet arrangement to flow through the first limb towards the air gap (to the second part) and then back from the air gap through the second limb (e.g. and returns to the permanent magnet arrangement).

In a second set of embodiments (double air-gap embodiments): the first part is positioned between first and second opposed faces of the second part; and the air gap comprises: a first air-gap section separating a first side of the first part from the first face of the second part; and a second air-gap section separating a second side of the first part from the second face of the second part; wherein the first limb defines a first magnetic flux path extending from the coil-winding section towards the first air-gap section and the second limb defines a second magnetic flux path extending from the coil-winding section towards the second air-gap section.

For example, in the case that the first and second limbs define first and second air-gap facing surfaces and the permanent magnet arrangement defines a third air-gap facing surface, the first and third air-gap facing surfaces may face the first air gap section and the second air-gap facing surface faces the second air gap section. In one embodiment the first air-gap facing surface (e.g. and third air-gap facing surface) is substantially opposed to the second air-gap facing surface.

In the case of a second part comprising a plurality of spaced magnetic flux guide regions, in one embodiment the first face of the second part comprises a first plurality of spaced magnetic flux guide regions (e.g. a first plurality of magnetic flux guide regions spaced along the predetermined path of travel) and the second face of the second part comprises a second plurality of spaced magnetic flux guide regions (e.g. a second plurality of magnetic flux guide regions spaced along the predetermined path of travel).

In one embodiment, the pole piece of each activatable magnet element comprises a further permanent magnet arrangement provided between the first and second limbs, the further permanent magnet arrangement being orientated to form a magnetic circuit with the first-defined magnet when the electrically conductive coil is inoperative during the inactive mode. In one embodiment, the further permanent magnet arrangement defines a fourth air-gap facing surface (e.g. positioned to face the single air gap in the case of a single air-gap embodiment or positioned to face the second air gap section in the case of a double air-gap embodiment).

In one embodiment, each activatable magnet element comprises a further pole piece connecting the first-defined and further permanent magnet arrangements in parallel to the first-defined pole piece.

In the inactive mode, magnetic flux from the first-defined permanent magnet arrangement flows through the first limb, through the parallel coil-winding and parallel flux path sections and then through the second limb to the further permanent magnet arrangement.

In the active mode, magnetic flux generated by the energised electrically conductive coil in opposition to the magnetic flux of the first-defined permanent magnet arrangement causes the magnetic flux of the first-defined permanent magnet arrangement to flow through the first limb towards the air gap (to the second part) and then back from the air gap through the further pole piece to the further permanent magnet arrangement.

In one embodiment, the further pole piece comprises: a third limb (e.g. defining a magnetic flux path section mirroring that of the first limb); and a fourth limb (e.g. defining a magnetic flux path section mirroring that of the second limb.

In one embodiment, the third limb defines a fifth air-gap facing surface (e.g. positioned to face the single air gap in the case of a single air-gap embodiment or positioned to face the first air gap section in the case of a double air-gap embodiment).

In one embodiment, the fourth limb defining a sixth air-gap facing surface (e.g. positioned to face the single air gap in the case of a single air-gap embodiment or positioned to face the second air gap section in the case of a double air-gap embodiment).

In one embodiment, the further pole piece further defines a connecting section extending between the third and fourth limbs (e.g. defining a magnetic flux path section mirroring that of the coil-winding section).

In one embodiment, the further pole piece yet further defines a further parallel flux path section providing a flux path in parallel to the connecting section (e.g. defining a magnetic flux path section mirroring that of the first-defined parallel flux path section).

In one embodiment, the pole piece and further pole piece are substantially identical pieces (e.g. to simplify manufacture of the activatable magnet element).

In one embodiment, the connecting section supports a supplementary electrically conductive coil (e.g. to further reduce the size/power handling of the first/further electrically conductive coils provided on the first-defined pole piece).

In one embodiment, the further parallel flux path section supports a further supplementary electrically conductive coil (e.g. to yet further reduce the size/power handling of the first/further electrically conductive coils provided on the first-defined pole piece).

In one group of embodiments (single magnet embodiments) the permanent magnet arrangement and/or further permanent magnet arrangement comprises a single permanent magnet.

In one group of embodiments (multiple magnet embodiments) the permanent magnet arrangement and/or further permanent magnet arrangement comprises a plurality of mutually spaced permanent magnets (e.g. arranged in series along a magnetic flux path extending from a first end of the coil-winding section to a second end of the coil-winding section).

In the case of a pole piece defining an air-gap facing surface extending in multiple planes, the plurality of permanent magnets may be distributed between the multiple planes.

In the case that the second part comprises a plurality of magnetic flux guide regions, the plurality of spaced magnetic flux guide regions may be spaced to coincide with the plurality of mutually spaced permanent magnets (e.g. in addition to be being spaced along the predetermined path of travel).

In one group of embodiments (multi-part pole piece embodiments), the pole piece comprises a plurality of subparts connected together.

In one embodiment, the plurality of subparts comprise a first subpart defining at least a first part of the coil-winding section and a second subpart, wherein the first and second subparts are configured to be installed around a preformed electrically conductive coil.

In this way, the first and second subparts may be installed around a preformed electrically conductive coil to avoid the need to wind the coil around an awkward structure. This may be particularly useful where the coil-winding section is positioned between the permanent magnet arrangement and the parallel flux path section.

In one embodiment, the second subpart defines a second part of the coil-winding section.

In one embodiment, the first subpart defines a first part of the parallel flux path section and the second subpart defines a second part of the parallel flux path section.

In one embodiment, the coil-winding section has a first saturation level capacity $S_1$ (first magnetic saturation level) and the parallel flux path section has a second saturation level capacity $S_2$ (second magnetic saturation level)

In one embodiment, $S_1$ is substantially equal to $S_2$.

In one embodiment, the coil-winding section and the parallel flux path section have a combined saturation level capacity $S_3$ that is sufficient to accept the full magnetic flux $F_{pm}$ from the permanent magnet arrangement during the inactive mode of operation.

In one embodiment, the air-gap facing surface has a surface area $A_1$.

In one embodiment, the air-gap facing surface has a perimeter $P_1$.

In one embodiment, the air-gap facing surface is an elongate air-gap facing surface with a lateral width $W_1$ and a longitudinal length $L_1$, wherein $L_1$ is greater than $W_1$.

In one embodiment, the coil-winding section has an effective (e.g. mean) cross-sectional area $A_2$ in the magnetic flux flow direction. For example, the coil-winding section may have a substantially constant cross-sectional area $A_2$ along its length in the magnetic flux flow direction (e.g. a substantially constant cross-sectional profile along its length in the magnetic flux flow direction).

In one embodiment, the parallel flux path section has an effective (e.g. mean) cross-sectional area $A_3$ in the magnetic flux flow direction. For example, the parallel flux path section may have a substantially constant cross-sectional area $A_3$ along its length in the magnetic flux flow direction (e.g. a substantially constant cross-sectional profile along its length in the magnetic flux flow direction).

In one embodiment, $A_2$ is substantially equal to $A_3$.

In one embodiment, $A_1 \geq A_2 + A_3$ (e.g. $A_1 > A_2 + A_3$).

In one embodiment, $A_1 \geq (A_2+A_3)*(S_3/F_{pm})$.

In one embodiment, $A_1$ is substantially equal to $(A_2+A_3)*(S_3/F_{pm})$.

In one embodiment, the coil-winding section has a lateral width $W_2$ and a longitudinal length $L_2$, wherein $W_2$ is substantially equal to $L_2$.

In one embodiment, the coil-winding section has a substantially square or a substantially circular cross-section (e.g. circular cross-section or substantially circular polygonal profile).

In one embodiment, the coil-winding section has a cross-sectional perimeter $P_2$, wherein $P_2$ is less than $P_1$.

In one embodiment, the parallel flux path section has a lateral width $W_3$ and a longitudinal length $L_3$, wherein $W_3$ is substantially equal to $L_3$.

In one embodiment, the parallel flux path section has a substantially square or a substantially circular cross-section (e.g. circular cross-section or substantially circular polygonal profile).

In one embodiment, the parallel flux path section has a cross-sectional perimeter $P_3$, wherein $P_3$ is less than $P_1$.

In one embodiment, $P_2+P_3<P_1$ (e.g. substantially less).

In one embodiment, the permanent magnet arrangement has an effective (e.g. mean) cross-sectional area $A_4$ in the magnetic flux flow direction (e.g. along its magnetic length). For example, the permanent magnet arrangement may have a substantially constant cross-sectional area $A_4$ along its length in the magnetic flux flow direction (e.g. a substantially constant cross-sectional profile along its length in the magnetic flux flow direction).

In one embodiment, $A_4 \geq A_2+A_3$.

In one embodiment, $A_4 \geq 1.5*(A_2+A_3)$.

In one embodiment, $A_4 > 2*(A_2+A_3)$.

In one embodiment, $A_4 \geq (A_2+A_3)*(S_3/F_{pm})$.

In one embodiment, $A_4$ is substantially equal to $(A_2+A_3)*(S_3/F_{pm})$.

As used herein, the terms lateral width and longitudinal length mean the maximum lateral width and maximum longitudinal length of the sections. The lateral width is defined as the width in the direction of a path connecting the plurality of spaced activatable magnet elements and may be a circumferential path or a linear path depending upon the motor/generator geometry. The longitudinal length is defined as the maximum length in a direction perpendicular to the lateral width of the elongate air-gap facing surface.

In a first series of embodiments (rotary embodiments), the first part is rotatable relative to the second part about a rotary axis (i.e. the predetermined path of travel is a circumferential path centred around the rotary axis). In this way, the apparatus may be configured to convert between electrical energy and rotary motion (hereinafter "rotary machine"), such as a rotary motor or rotary input generator.

In one embodiment, the plurality of activatable magnet elements are spaced circumferentially relative to the rotary axis.

In one embodiment, the apparatus is an axial flux device and the air-gap facing surface extends radially relative to the rotary axis.

In one embodiment, the apparatus is a radial flux device and the air-gap facing surface extends axially relative to the rotary axis.

In one embodiment, the apparatus is a hybrid axial/radial flux device and the air-gap facing surface extends with axial and radial components relative to the rotary axis.

In a second series of embodiments (linear embodiments), the first part is operative to move relative to the second part along a linear axis (e.g. the path of travel is a linear path). In this way, the apparatus may be configured to convert between electrical energy and linear motion (hereinafter "linear machine"), such as a linear motor or linear input generator.

In one embodiment, the plurality of activatable magnet elements are axially spaced relative to the linear axis.

In one embodiment, the first part is a movable (e.g. rotor) part and the second part is a stator part.

In one embodiment, the first part is a stator part and the second part is a movable (e.g. rotor) part.

In the case of a rotary machine, the moveable part of the apparatus (rotor) may have a substantially annular profile.

In one embodiment, the apparatus further comprises control circuitry operative to control current supply to the electrically conductive coils of the plurality of activatable magnet elements.

In one embodiment, the control circuitry controls the level (e.g. current level and/or voltage level) and timing of current flowing through the electrically conductive coils.

In one embodiment, the control circuitry is operative to control the level and timing of current flowing through each electrically conductive coil individually or to independently control the level and timing of current flowing through a plurality of groups of the electrically conductive coils.

In one embodiment, the control circuitry senses the relative position of the first part relative to the second part and is operative to determine the optimum timing and magnitude of current to be delivered to the electrically conductive coils.

In one embodiment, the plurality of activatable magnet elements are divided into a plurality of phase groups, wherein each phase group receives current (e.g. from the current control circuitry) at a different time to the other phase groups.

In one embodiment, the apparatus is an electrical vehicle motor, an electric aircraft motor or an electric watercraft motor.

Embodiments of the present invention will now be described by way of example with reference to the accompanying drawings in which.

Figure 2A:
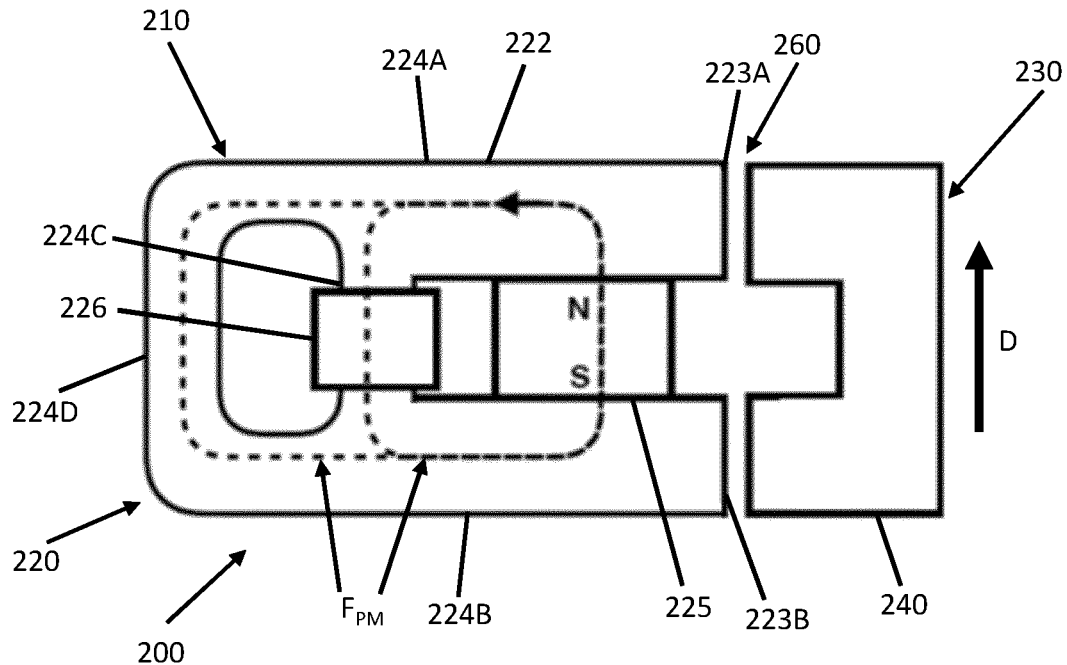
FIG. 2A is a schematic illustration of the operation of a part of a reluctance motor/generator design in accordance with a first embodiment of the present invention with the activatable magnet element in a de-energised mode.
Figure 2B:
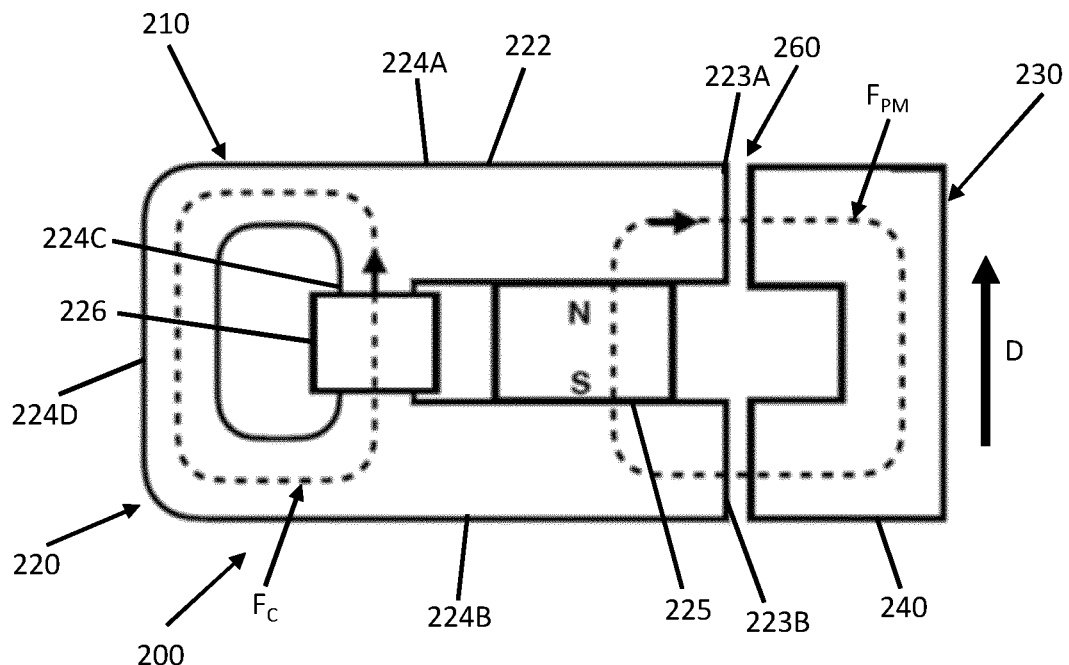
FIG. 2B is a schematic illustration of the operation of the part of the reluctance motor/generator design of FIG. 2A with the activatable magnet element in an energised mode.

FIGS. 2A and 2B illustrate an example of a reluctance motor/generator 200 in accordance with the present invention operative in the same manner as reluctance motor/generator 100. Reluctance motor/generator 200 comprises: a stator 210 and a rotor 230 movable relative to the stator 210 and spaced therefrom by an airgap 260. Stator 210 includes a plurality of activatable magnet elements 220 and rotor 230 includes a plurality of magnetic flux guide elements 240 (again for simplicity only a single activatable magnet element and a single magnetic flux guide element are shown). Each activatable magnet element 220 is operative when activated by application of an electric current thereto to direct a magnetic field across the air gap 260 to an opposed magnetic flux guide element 240.

Each activatable magnet element 220 comprises: a high permeability pole piece 222 defining a pair of air-gap facing surfaces 223A, 223B, the pole piece 222 comprising: a first limb 224A; a second limb 224B; a coil-winding section 224C positioned between the first and second limbs 224A, 224B; a permanent magnet arrangement 225 provided between the first and second limbs 224A, 224B and magnetically in parallel to the coil-winding section 224C; and an electrically conductive coil 226 wound around the coil-winding section 224C of the pole piece 222, wherein the electrically conductive coil 226 is operative to generate a magnetic flux oriented to oppose the magnetic flux of the permanent magnet arrangement 225. In contrast to the arrangement of FIG. 1A, the pole piece 222 further includes a parallel flux path section 224D extending magnetically in parallel to the coil-winding section 224C operative to allow magnetic flux from the permanent magnet arrangement 225 to flow in parallel to the coil-winding section 224C.

As illustrated in FIG. 2A, in an inactive mode of operation the electrically conductive coil 226 is de-energised and magnetic flux ($F_{PM}$) from the permanent magnet arrangement 225 will preferentially flow in parallel through the coil-winding section 224C and parallel flux path section 224D in preference to across the air gap 260.

As illustrated in FIG. 2B, in an active mode of operation the electrically conductive coil 226 is energised to generate a magnetic flux ($F_C$) to oppose the magnetic flux ($F_{PM}$) of the permanent magnet arrangement 225 and the magnetic flux from the permanent magnet arrangement 225 will preferentially flow across the air gap 260 as the reluctance across the air gap 260 is now lower than the path through the pole piece 222 with the opposed coil flux present. The magnetic flux across the air gap 260 flows through the magnetic flux guide element 240 and returns across the air gap to second limb 224B to complete the magnetic circuit and generate an alignment force as described in relation to FIGS. 1A-1B.

Figure 1A:
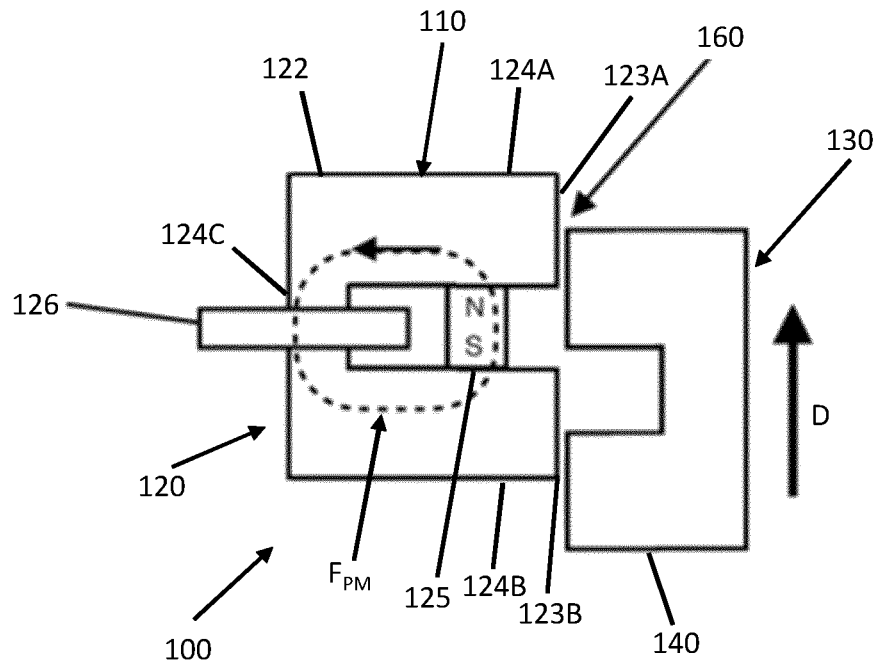
FIG. 1A is a schematic illustration of the operation of a part of a reluctance motor/generator design based on a principle known in the prior art with the activatable magnet element in an de-energised mode.
Figure 1B:
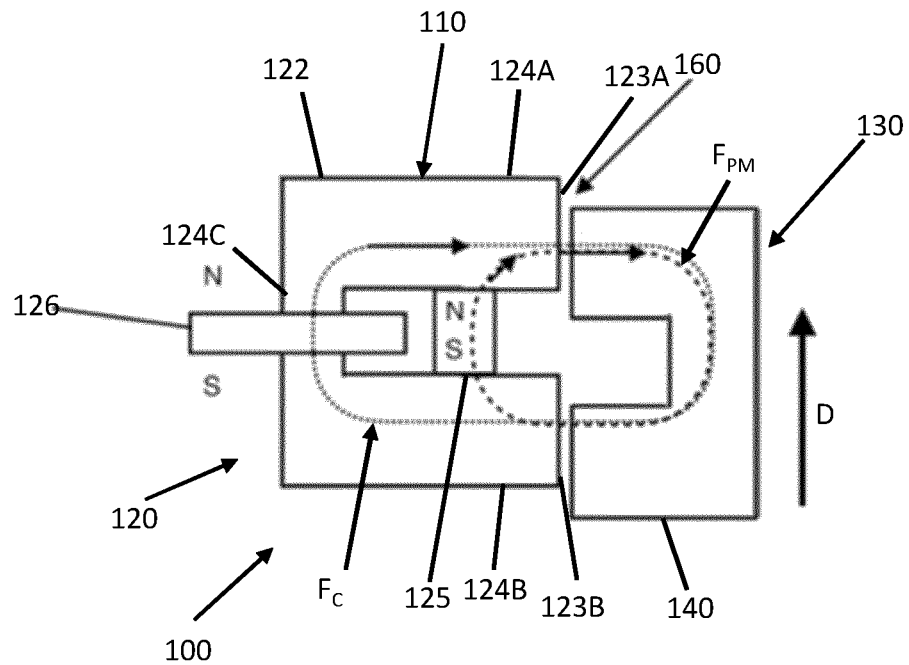
FIG. 1B is a schematic illustration of the operation of the part of the reluctance motor/generator design of FIG. 1A with the activatable magnet element in an energised mode.

Advantageously, the provision of the parallel flux path section 224D allows a smaller, lower power coil to be used to switch application of the magnetic flux of the permanent magnet across the air gap than would be required for the arrangement of FIG. 1 since the coil-winding section 224C needs only be dimensioned to receive a portion (in this example half) of the magnetic flux of the permanent magnet arrangement 225 and the coil flux does not need to overcome an air gap or a magnet reluctance (the flux generated by the coil only circulates locally through the two limbs). For example, for a permanent magnet with a strength of around 1 Tesla and a coil-winding section 224 and parallel flux path section 224 of identical cross-sectional area formed from iron (with a magnetic saturation level of around 2 Tesla), the cross-sectional area of the coil-winding section would only need to be a quarter of the cross-sectional area of the permanent magnet and half the cross-sectional area required in the arrangement of FIGS. 1A-1B. This in turn reduces the mean turn length of the coil. Advantageously, by reducing the length of coil, heat loss through the coil (which is dependent upon wire length) may be reduced with a corresponding reduction in the mass and volume of the coil, together with a reduction in heat loss handling requirements (the latter of which can be a significant problem in high power applications.

Furthermore, since the first and second limbs 224A, 224B need only handle one of the permanent magnet flux and the coil flux at any particular time, the cross-sectional area of first and second limbs 224A, 224B need only be dimensioned for a single flux flow. In contrast, in the arrangement of FIGS. 1A and 1B the first and second limbs 124A, 124B must be dimensioned to simultaneously receive full flux flow from the permanent magnet arrangement 125 and electrically conductive coil 126 during the active mode. Accordingly, the cross-sectional area of first and second limbs 224A, 224B may potentially be half that of limbs 124A, 124B.

For optimum performance, the cross-sectional area of the permanent magnet arrangement 225 may be substantially matched with the air gap facing area of the pole piece 222 (defined by air-gap facing surfaces 223A, 223B) such that there is no magnetic saturation and maximum work can be performed by the air gap flux. The permanent magnet arrangement 225 and electrically conductive coil 226 can be regarded as two mmf sources in parallel. Provided the coil mmf is made greater than the permanent magnet mmf little or no flux will flow form the permanent magnet to the coil-winding or parallel flux path sections.

Figure 3A:
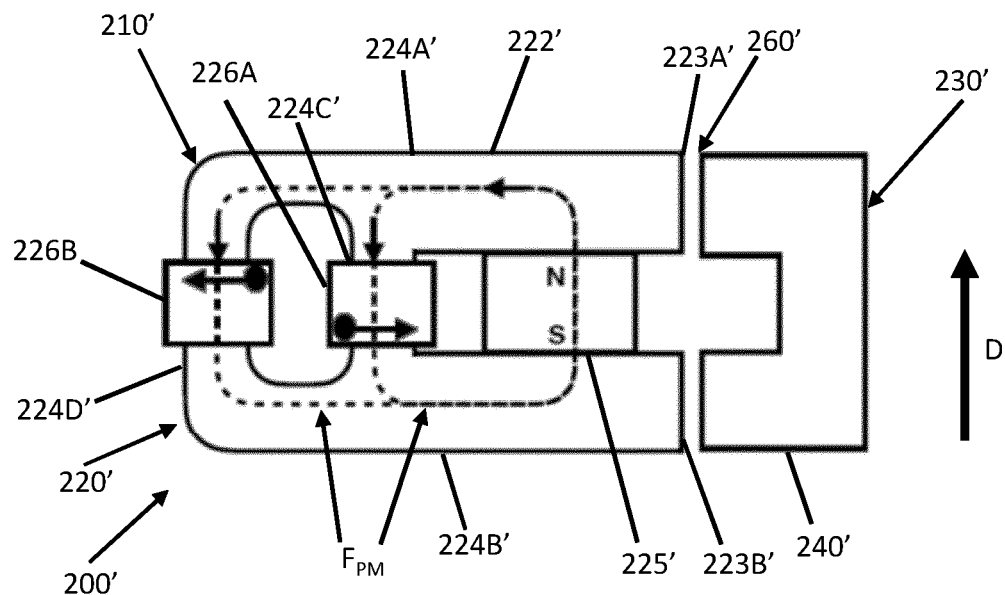
FIG. 3A is a schematic illustration of the operation of a part of a reluctance motor/generator design in accordance with a second embodiment of the present invention with the activatable magnet element in a de-energised mode.
Figure 3B:
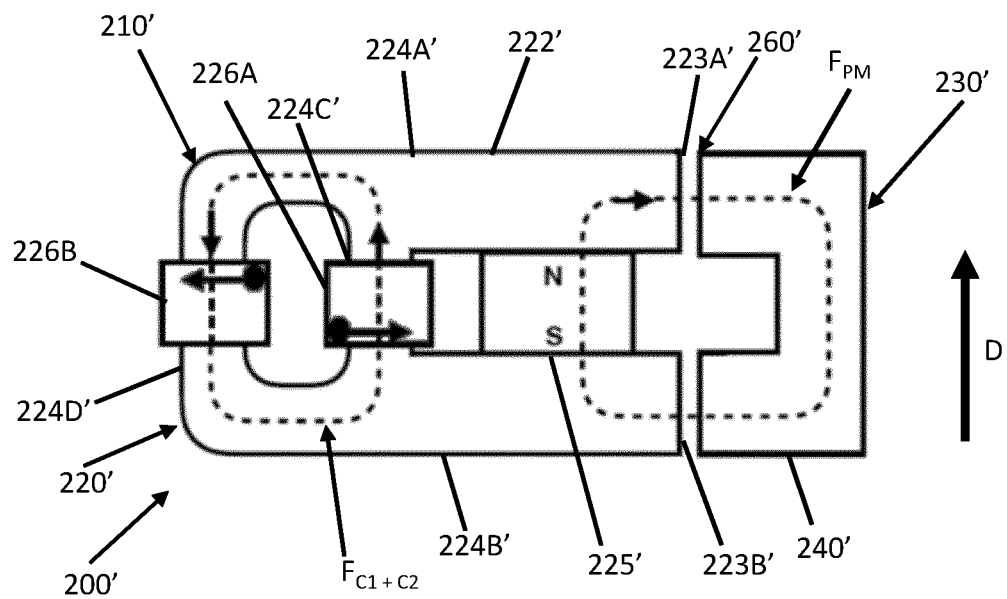
FIG. 3B is a schematic illustration of the operation of the part of the reluctance motor/generator design of FIG. 3A with the activatable magnet element in an energised mode.

FIGS. 3A and 3B illustrate an example of a reluctance motor/generator in accordance with a further embodiment of the present invention based on the reluctance motor/generator of FIGS. 2A-2B (features in common are labelled accordingly) with the single electrically conductive coil 226 replaced by first and second electrically conductive coils 226A, 226B wound around the coil-winding and parallel flux path sections 224C', 224D' respectively.

As illustrated in FIG. 3A, in an inactive mode of operation the first and second electrically conductive coils 226A, 226B are de-energised and magnetic flux ($F_{PM}$) from the permanent magnet arrangement 225' will preferentially flow in parallel through the coil-winding section 224C' and parallel flux path section 224D' in preference to across the air gap 260'.

As illustrated in FIG. 3B, in an active mode of operation the first and second electrically conductive coils 226A, 226B are energised to generate a magnetic flux ($F_{C1+C2}$) to oppose the magnetic flux ($F_{PM}$) of the permanent magnet arrangement 225' and the magnetic flux from the permanent magnet arrangement 225' will preferentially flow across the air gap 260' as the reluctance across the air gap 260' is now lower than the path through the pole piece 222' with the opposed coil flux present. The magnetic flux crosses the air gap 260 and flows through the magnetic flux guide element 240 and back across the air gap 260 to the second limb 224B' in the manner previously described.

The second electrically conductive coil 226B is not essential to the machine operation and can be omitted. However, if included it can provide a number of benefits:

Firstly, power handling is shared between the first and second electrically conductive coils 226A, 226B and the size of the first electrically conductive coil 226A may be further reduced relative to electrically conductive coil 226 of the previous embodiment.

Secondly, the second electrically conductive coil 226B can be used to as a control device to allow electrical current to flow only when the permanent magnet flux is returning from the air gap (when the current to the first electrically conductive coil 226A is removed or substantially reduced), thus it ensures maximum efficiency by salvaging energy that may otherwise be lost and it allows for more precise control of the induced current waveform. Without it the returning permanent magnetic flux will partially bypass the first electrically conductive coil 226A thus limiting the ability to profile the decreasing current waveform or salvage energy.

FIGS. 4A-4D illustrate a hybrid axial/radial flux rotary reluctance motor/generator apparatus 300 comprising a stator 310 and a rotor 330 arranged about a rotary axis "R". Rotor 330 is configured to rotate relative to stator 310 about rotary axis "R" and is spaced therefrom by a circumferentially extending V-shaped active air gap 360 extending both axially and radially relative to the rotary axis "R". The V-shaped air gap 360 includes a short axially-extending central portion 360A and a pair of opposed outer portions 360B, 360C extending at substantially 45° from the axial direction of the central portion.

Stator 310 comprises an outer annular array of n circumferentially spaced activatable magnet elements 320. Rotor 330 comprises an inner annular array of p circumferentially spaced magnetic flux guide elements 340 (wherein typically n=p+/−2, 3, 4, 6, 8, 9, 10 or 12 depending upon the require phase operation). Each activatable magnet element 320 is operative when activated by application of an electric current thereto to direct a magnetic field across the air gap 360 to a nearest opposed magnetic flux guide element 340.

Each activatable magnet element 320 comprises: a high permeability pole piece 322 defining a pair of air-gap facing surfaces 323A, 323B, the pole piece 322 comprising: a first limb 324A; a second limb 324B; a coil-winding section 324C and a parallel flux path section 324D positioned magnetically in parallel between the first and second limbs 224A, 224B; a permanent magnet arrangement 325 (here a single permanent magnet) provided between the first and second limbs 324A, 324B and magnetically in parallel to each of the coil-winding section 324C and parallel flux path section 324D; and first and second electrically conductive coils 326A, 326B wound around the coil-winding section 324C and parallel flux path section 324D respectively, wherein the electrically conductive coil 326 is operative to generate a magnetic flux oriented to oppose the magnetic flux of the permanent magnet arrangement 325.

Figure 4A:
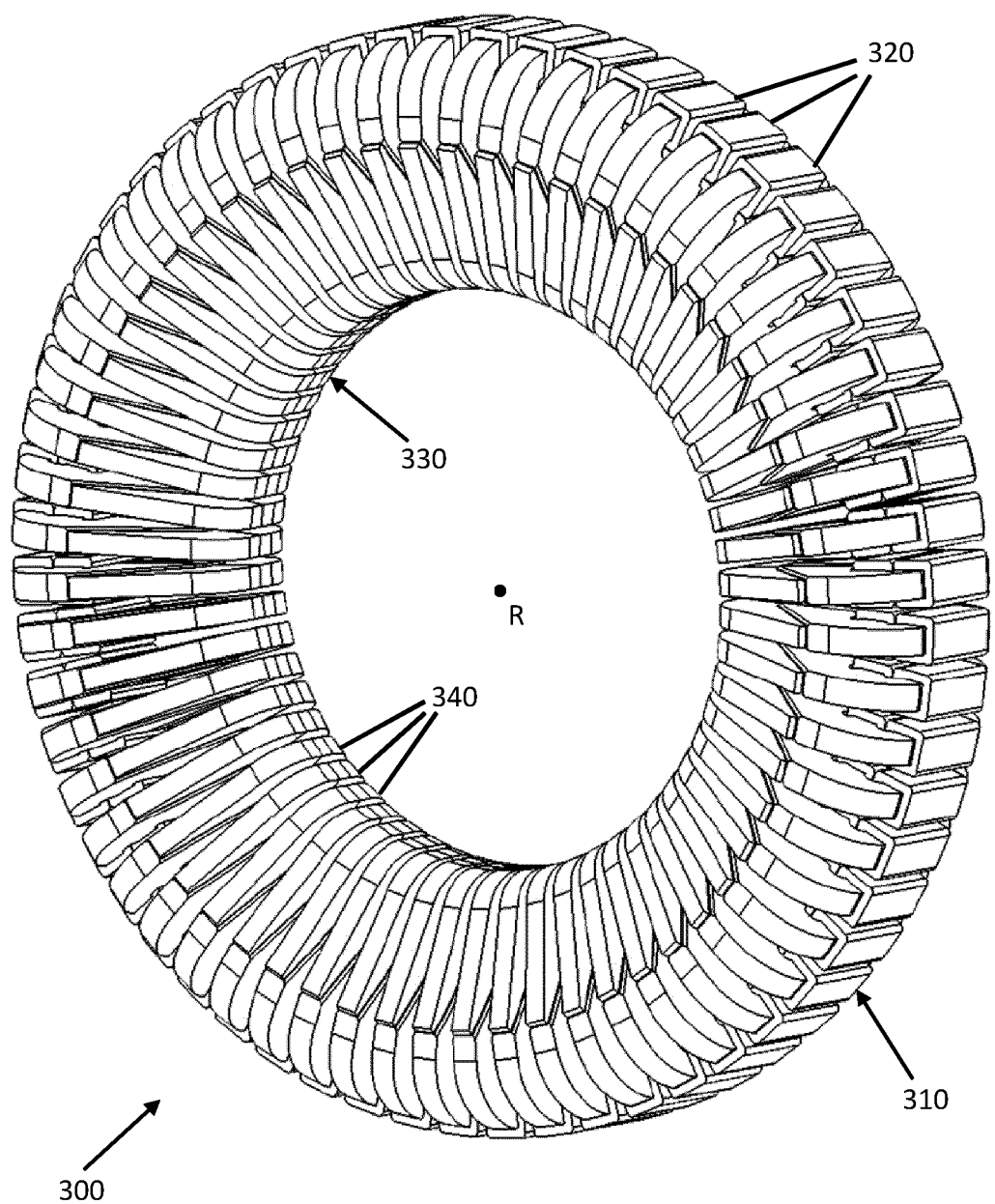
FIG. 4A is a schematic perspective view of a radial flux reluctance motor/generator in accordance with a third embodiment of the present invention.
Figure 4B:
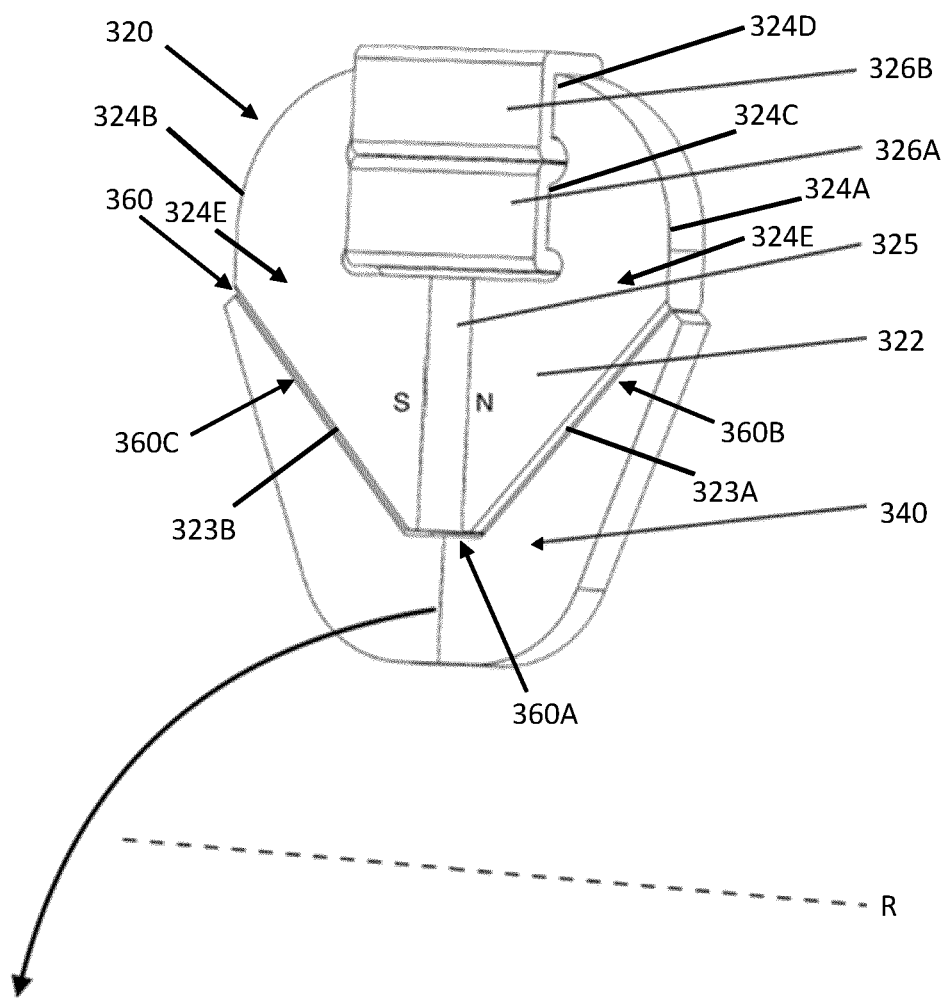
FIG. 4B is a schematic perspective view of rotor/stator parts of the reluctance motor/generator of FIG. 4A.
Figure 4C:
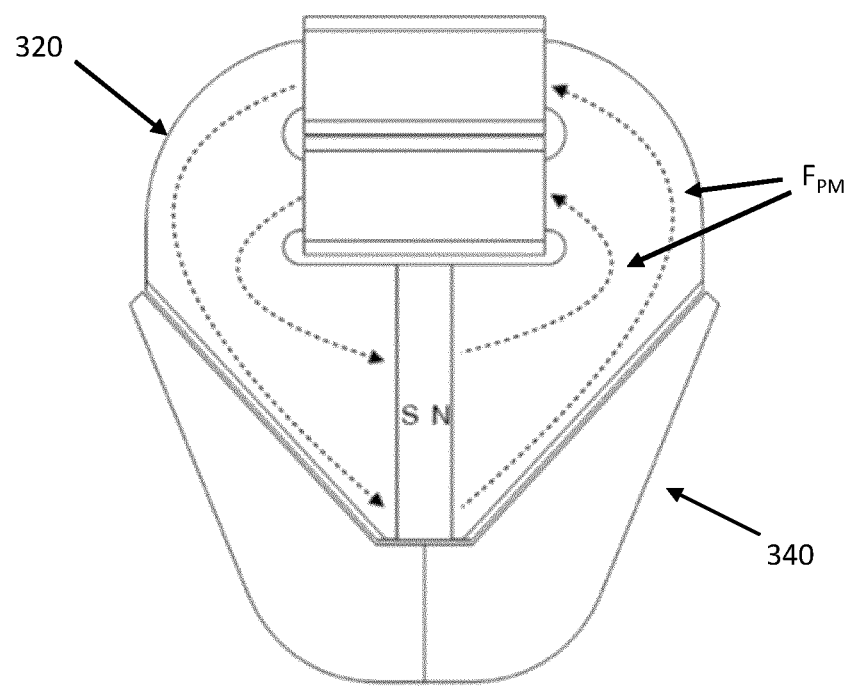
FIG. 4C is a schematic cross-sectional view of the rotor/stator parts of the reluctance motor/generator of FIG. 4A with the activatable magnet element in a de-energised mode.

As illustrated in FIG. 4C, in an inactive mode of operation the first and second electrically conductive coils 326A, 326B are de-energised and magnetic flux ($F_{PM}$) from the permanent magnet arrangement 325 will preferentially flow in parallel through the coil-winding section 324C and parallel flux path section 324D in preference to across the air gap 360.

Figure 4D:
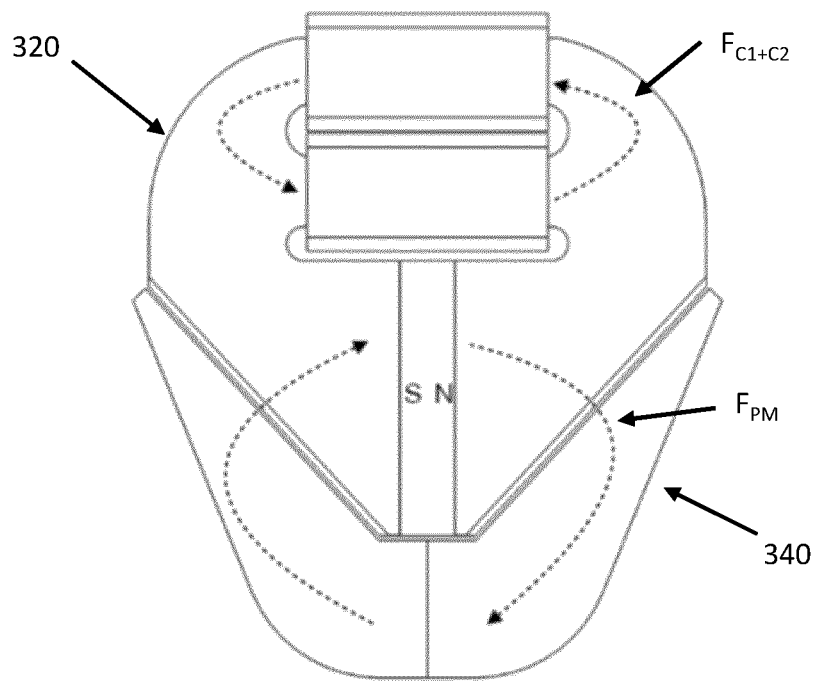
FIG. 4D is a schematic cross-sectional view of the rotor/stator parts of the reluctance motor/generator of FIG. 4A with the activatable magnet element in an energised mode.

As illustrated in FIG. 4D, in an active mode of operation the first and second electrically conductive coils 326A, 326B are energised to generate a magnetic flux ($F_{C1+C2}$) to oppose the magnetic flux ($F_{PM}$) of the permanent magnet arrangement 325 and the magnetic flux from the permanent magnet arrangement 325 will preferentially flow along first limb 324A and across the air gap 360 as the reluctance across the air gap 360 is now lower than the path through the pole piece 322 with the opposed coil flux present. The magnetic flux crosses the air gap 360 to magnetic flux guide element 340 and returns across air gap 360 to second limb 324B to complete the magnetic circuit.

The first and second limbs 324A, 324B are dimensioned to permit full flow of magnetic flux to and from the permanent magnet without fully reaching saturation. Each of the coil-winding section 324C and parallel flux path section 324D have square cross-sectional profiles along the flux path direction and have identical cross-sectional areas/magnetic saturation capacity. Although a square cross-section is illustrated for the coil-winding section 324C and parallel flux path section 324D, a circular or substantially circular cross-section will provide the possibility of a further reduction in coil length/reduced coil stress but is more complex to manufacture.

As illustrated, each of the first and second limbs 324A, 324B may have a flux flow restriction region 324E of reduced cross-sectional area provided between the permanent magnet arrangement 325 and the coil-winding section/parallel flux path sections 324C, 324D. Since in use pole piece 322 will be operating close to magnetic saturation during the active mode, any magnetic flux attempting to flow along the first limb 324A towards the coil-winding/parallel flux path sections 324C, 324D may lead to magnetic saturation of the restriction region 324E of the first limb 324A and this magnetic saturation will significantly increase the reluctance of the pole piece 322 and encourage preferential magnetic flux flow across the air gap 360.

Advantageously to construction, each activatable magnet element 320 has its magnetic flux constrained to its local domain when in the inactive mode and the rotor 330 does not include any permanent magnets. This means that each of the rotor and stator of the reluctance motor/generator apparatus 300 can be easily and safely assembled in segments and combined to form the final machine with minimal magnetic force to overcome when positioning the activatable magnetic elements. This is hugely significant for high power motor/generator machines where the magnetic forces experienced during coupling of the rotor to the stator can be extreme and present significant load-bearing/safety issues to the assembly plant.

Figure 5:
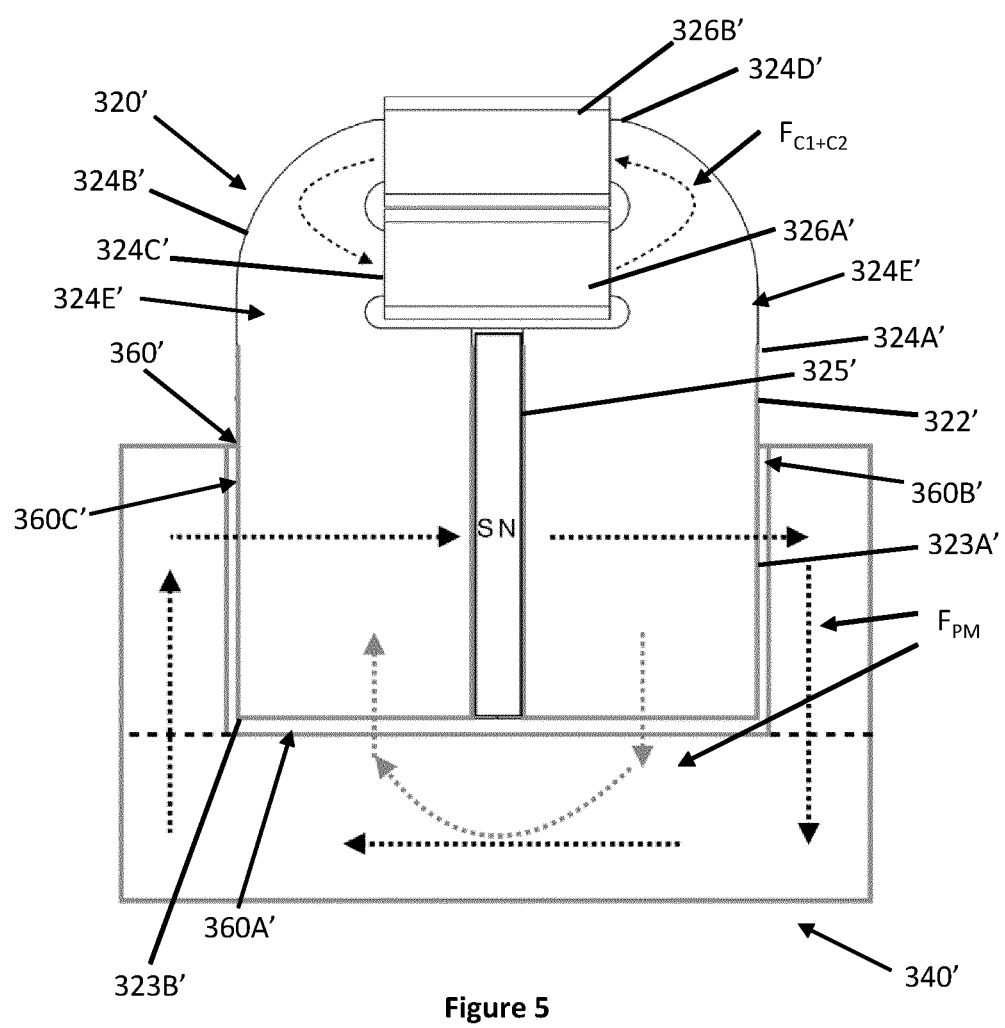
FIG. 5 is a schematic cross-sectional view of an alternative rotor/stator geometry for use in the reluctance motor/generator of FIG. 4A.

FIG. 5 shows an alternative geometry of activatable magnet element 320' and magnetic flux guide element 340' for use in the hybrid axial/radial flux rotary reluctance motor/generator apparatus 300 of FIG. 4A (features in common are labelled accordingly) with an active air gap 360' comprising a central axially extending portion 360A' and a pair of opposed outer portions 360B', 360C' extending radially and substantially normal to the central axially extending portion 360A'.

FIGS. 6A-6I illustrate a dual-rotor axial flux rotary reluctance motor/generator apparatus 400 comprising a central stator 410 and a pair of opposed outer rotors 430A, 430B arranged about a rotary axis "R" and separated from the central stator 410 by an air gap 460. Each rotor 430A, 420B is configured to rotate in unison relative to stator 410 about rotary axis "R". As illustrated, air gap 460 comprises a first circumferentially extending air gap section 460A separating the stator 420 from rotor 430A and a second circumferentially extending air gap section 460B separating the stator 420 from rotor 430B. Each of the circumferentially extending air gap sections 460A, 460B extend axially relative to the rotary axis "R".

Stator 410 comprises an annular array of n circumferentially spaced activatable magnet elements 420. Each rotor 430A, 430B comprises an annular array of p circumferentially spaced magnetic flux guide elements 440A, 440B (wherein typically n=p+/−2, 3, 4, 6, 8, 9, 10 or 12 depending upon the require phase operation). Each activatable magnet element 420 is operative when activated by application of an electric current thereto to direct a magnetic field across the first and second air gap sections 460A, 460B to magnetic flux guide elements 440A, 440B in opposed rotors 430A, 430B.

Each activatable magnet element 420 comprises a dual-plane pole piece arrangement 422 comprising: a first pole piece 422A extending in a first plane and defining a first pair of opposed air-gap facing surfaces 423A, 423B positioned to face the first air gap section 460A and second air gap section 460B respectively; first and second permanent magnet arrangements 425A, 425B; and a second pole piece 422B extending a second plane parallel to the first plane and defining a second pair of opposed air-gap facing surfaces 423C, 423D. The first pole piece 422A comprises: a first limb 424A; a second limb 424B; a coil-winding section 424C and a parallel flux path section 424D positioned magnetically in parallel between the first and second limbs 424A, 424B. The second pole piece 422B comprises: a third limb 424E; a fourth limb 424F; and first and second further parallel flux path sections 424G, 424H positioned magnetically in parallel between the third and fourth limbs 424E, 424F.

The activatable magnet element 420 further comprises first and second electrically conductive coils 426A, 426B wound around the coil-winding section 424C and parallel flux path section 424D respectively of the first pole piece 422A, wherein the first and second electrically conductive coils 426A, 426B are together operative to generate a magnetic flux oriented to oppose the magnetic flux of the permanent magnet arrangements 425A, 425B.

Figure 6A:
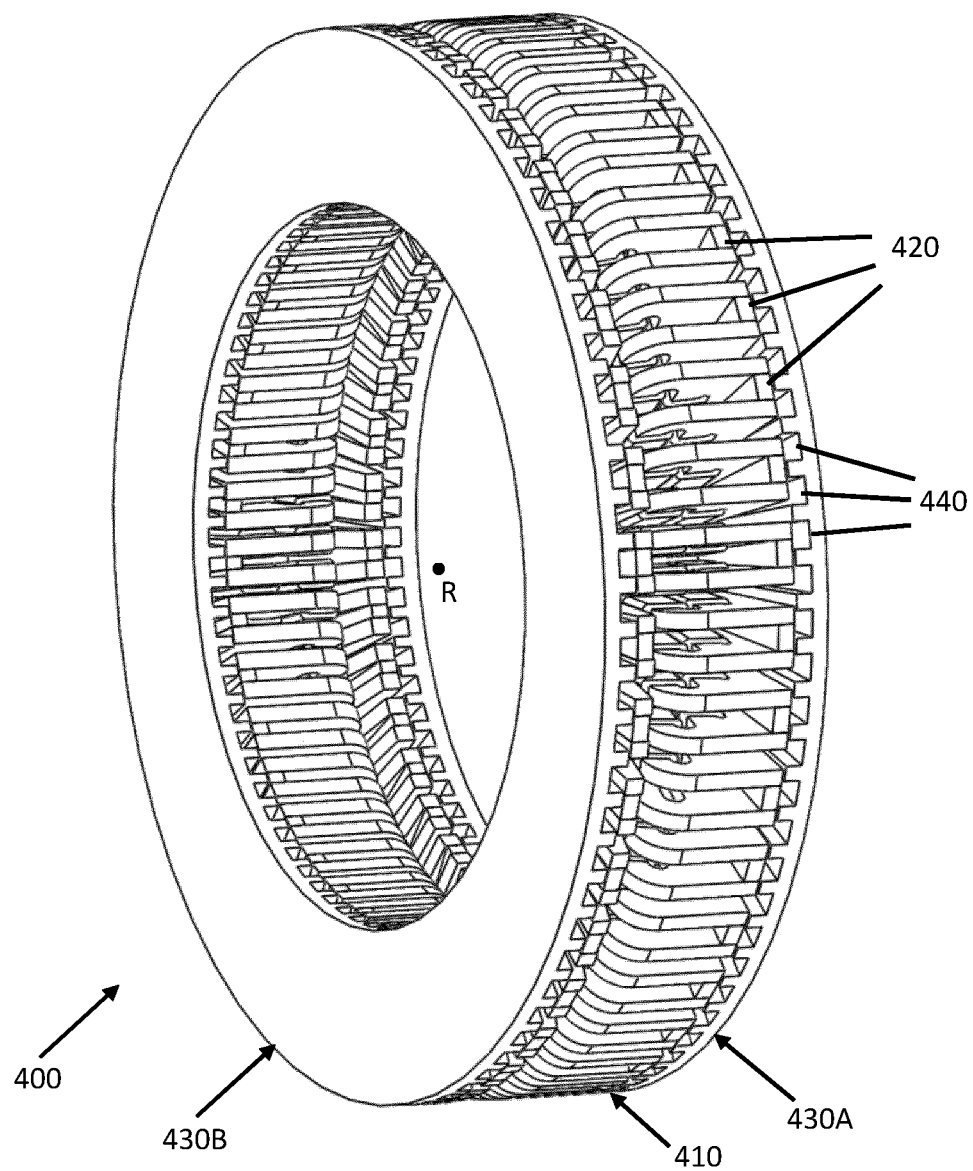
FIG. 6A is a schematic perspective view of a hybrid axial/radial flux reluctance motor/generator in accordance with a further embodiment of the present invention.
Figure 6B:
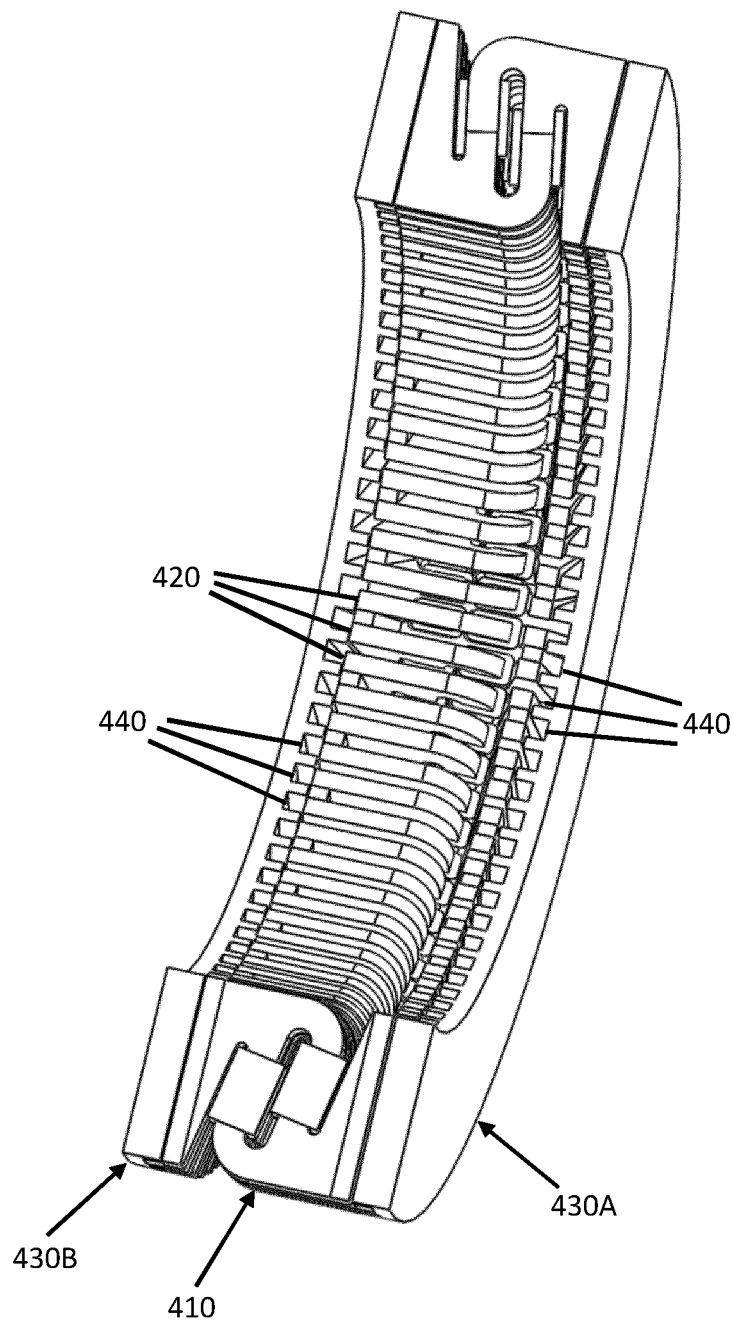
FIG. 6B is a schematic cutaway perspective view of the reluctance motor/generator of FIG. 6A.
Figure 6C:
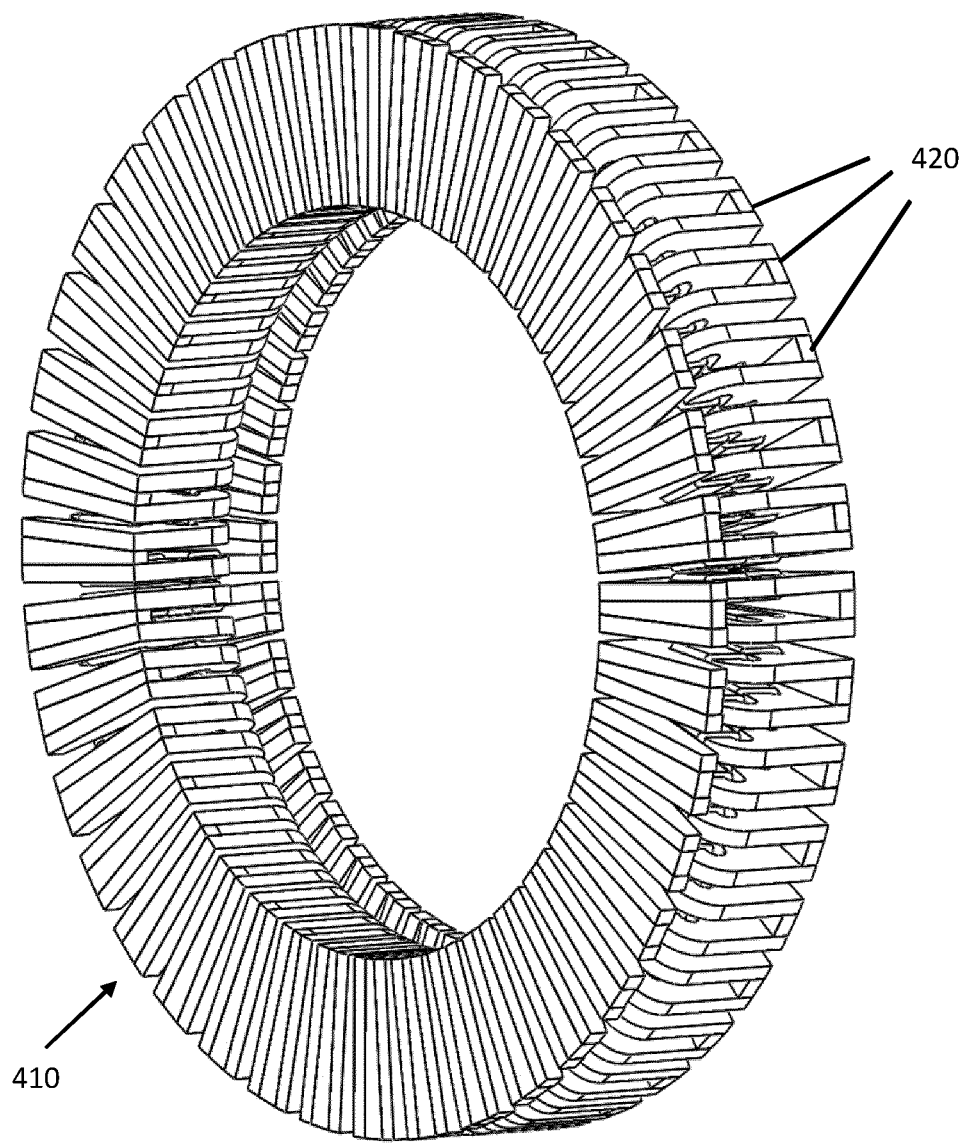
FIG. 6C is schematic perspective view of stator elements of the reluctance motor/generator of FIG. 6A.
Figure 6D:
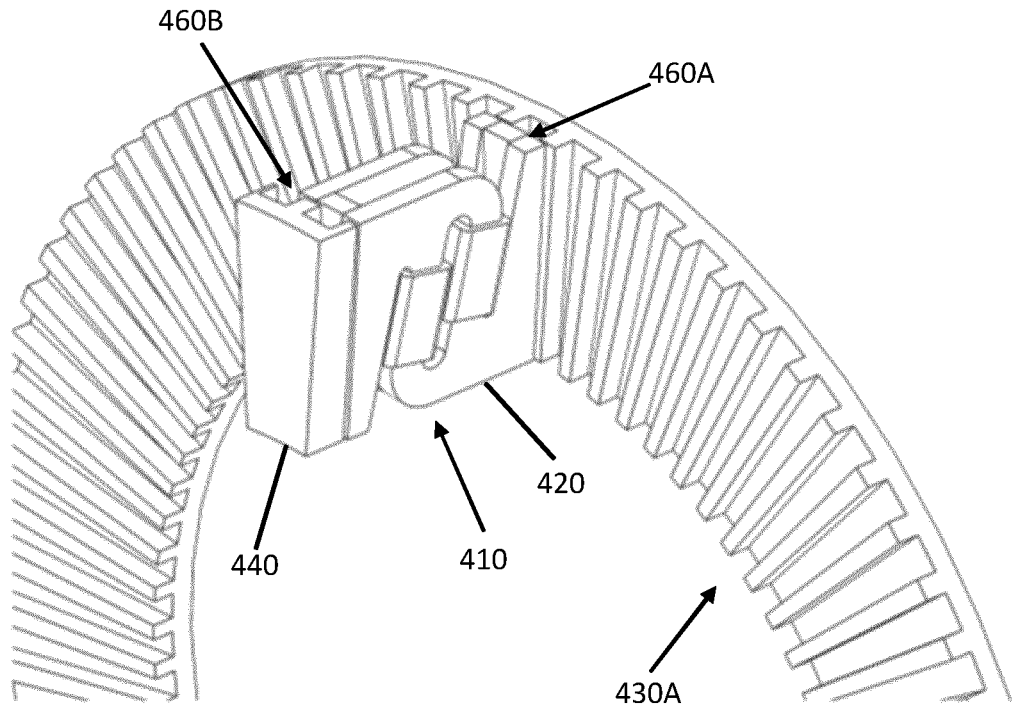
FIG. 6D is a schematic partial perspective view of rotor/stator parts of the reluctance motor/generator of FIG. 6A.
Figure 6E:
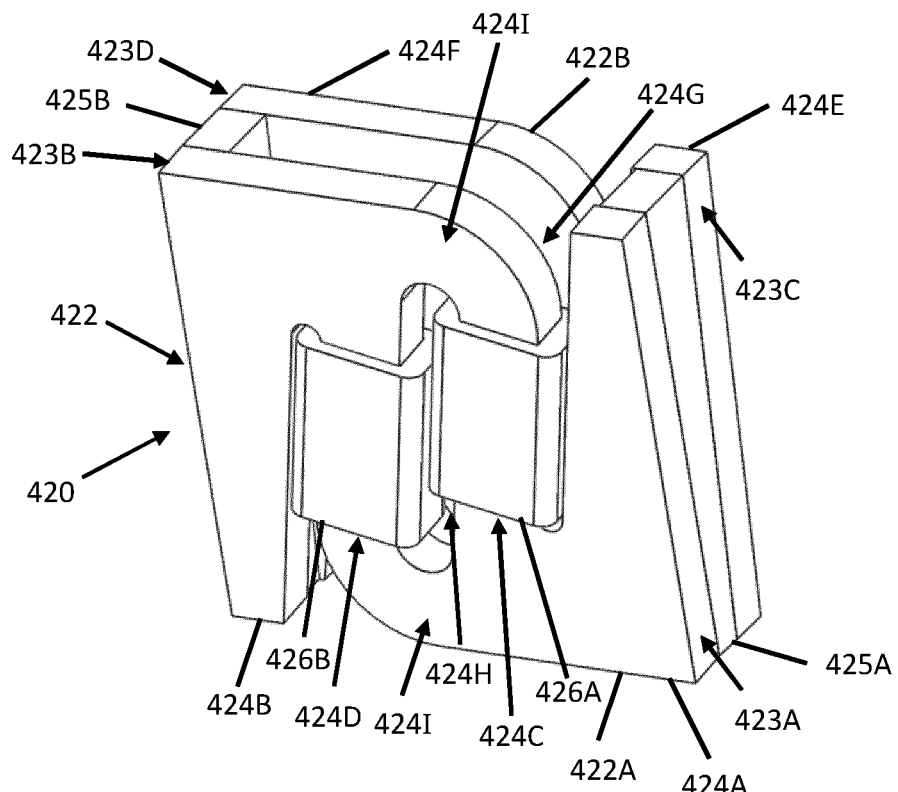
FIG. 6E is a schematic perspective view of the stator part of FIG. 6D.
Figure 6F:
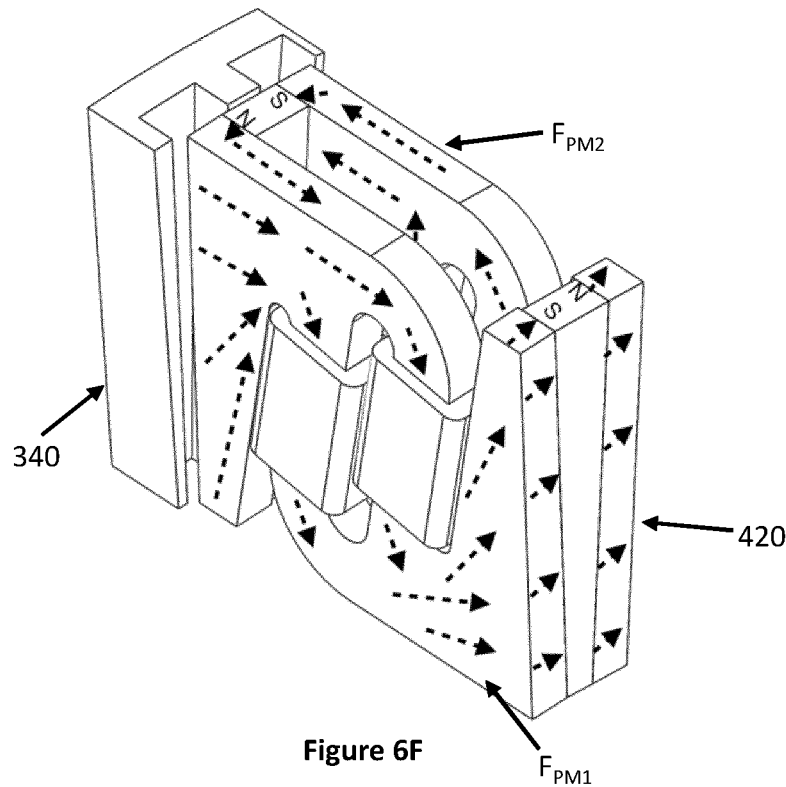
FIG. 6F is a schematic perspective view of rotor/stator parts of FIG. 6D with the activatable magnet element in a de-energised mode.

In this example, first and second permanent magnet arrangements 425A, 425B both comprise a single permanent magnet with a trapezoidal cross-sectional end profile. The first permanent magnet arrangement 425A is positioned between first limb 424A and fourth limb 424F; the second permanent magnet arrangement 425B is positioned between second limb 424B and third limb 424E, i.e. each permanent magnet arrangement is provided magnetically in parallel to each of the coil-winding section 424C and parallel flux path section 424D;

As illustrated in FIG. 6F, in an inactive mode of operation the first and second electrically conductive coils 426A, 426B are de-energised and magnetic flux ($F_{PM1}$) from the first permanent magnet arrangement 425A will preferentially flow in parallel through the coil-winding section 424C and parallel flux path section 424D of the first pole piece 422A to the second permanent magnet arrangement 425B in preference to across the first air gap section 460A. At the same time, magnetic flux ($F_{PM2}$) from the second permanent magnet arrangement 425B will preferentially flow in parallel through the first and second further parallel flux path sections 424G, 424H in the second pole piece 422B to the first permanent magnet arrangement 425A.

Figure 6G:
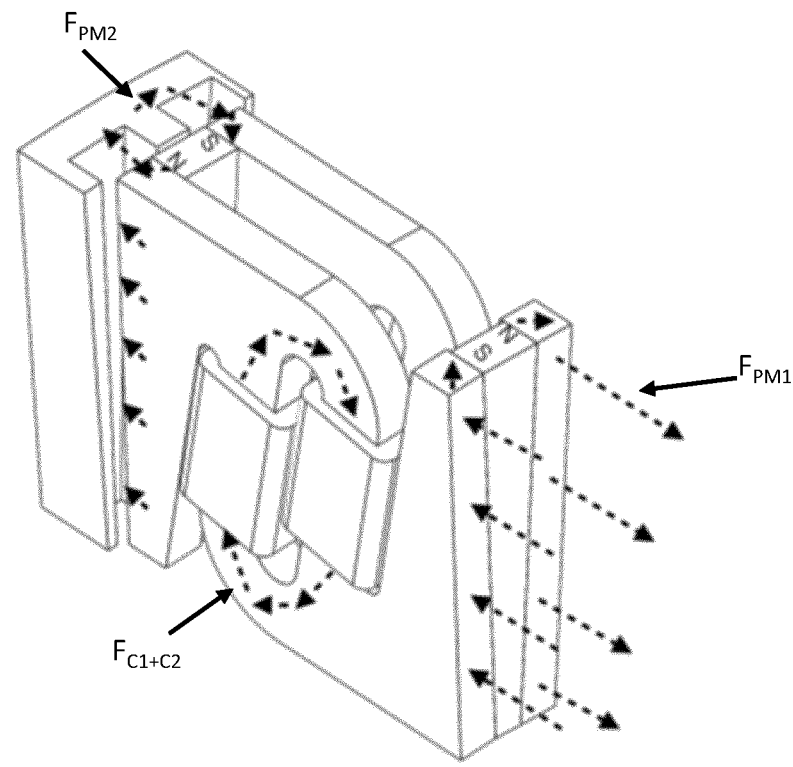
FIG. 6G is a schematic perspective view of rotor/stator parts of FIG. 6D with the activatable magnet element in an energised mode.

As illustrated in FIG. 6G, in an active mode of operation the first and second electrically conductive coils 426A, 426B mounted on the first pole piece 422A are energised to generate a magnetic flux ($F_{C1+C2}$) to oppose the magnetic flux ($F_{PM1}$) of the first permanent magnet arrangement 425A flowing across the first pole piece 422A and the magnetic flux from the first permanent magnet arrangement 425A will preferentially flow across the first air gap section 460A as the reluctance across the first air gap section 460A is now lower than the path through the first pole piece 422A with the opposed coil flux present. At the same time, this change in magnetic flux flow across the first pole piece 422A results in a corresponding change of magnetic flux flow direction across the second pole piece 422B as the return flow across the first air gap section 460A triggers the magnetic flux flow ($F_{PM2}$) from the second permanent magnet arrangement 425B to preferentially flow across the second air gap section 460B. In combination, the magnetic flux across the first air gap section 460A flows through magnetic flux guide element 440A and the magnetic flux across the second air gap section 460B flows through magnetic flux guide element 440B.

As illustrated, each of the first and second limbs 424A, 424B may have a flow restriction region 4241 of reduced cross-sectional area provided between their respective permanent magnet arrangements 425A, 425B and the coil-winding section/parallel flux path sections 424C, 424D. Since in use first pole piece 422A will be operating close to magnetic saturation during the active mode, any magnetic flux attempting to flow along the first limb 424A towards the coil-winding/parallel flux path sections 424C, 424D may lead to magnetic saturation of the restriction region 4241 of the first limb 424A and this magnetic saturation will significantly increase the reluctance of the pole piece 422A and encourage preferential magnetic flux flow across the first air gap section 460A.

Figure 6H:
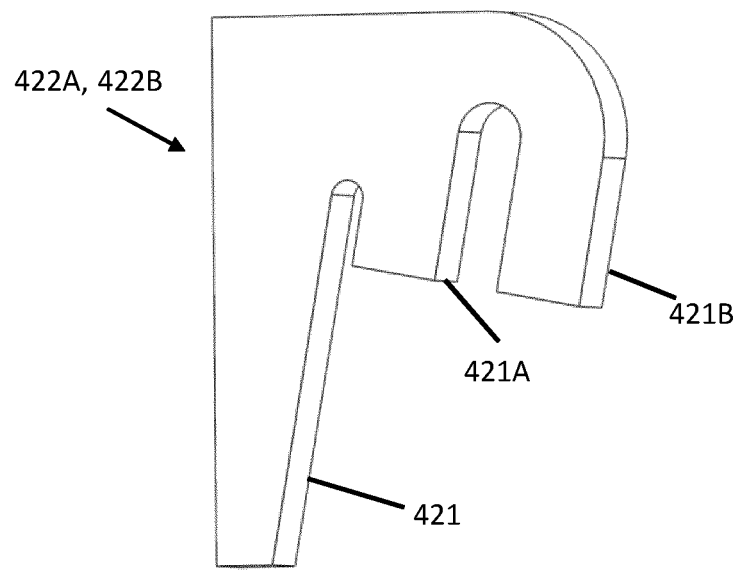
FIG. 6H is a schematic perspective view of a modular part used to form a pole piece of the activatable magnet element of the stator parts of the reluctance motor/generator of FIG. 6A.
Figure 6I:
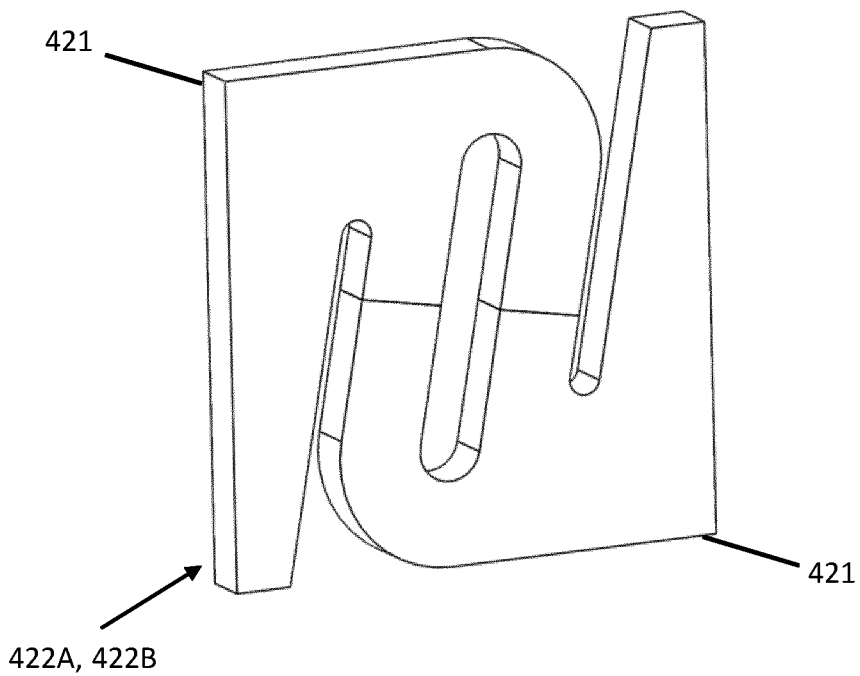
FIG. 6I is a schematic perspective view of two of the modular parts of FIG. 6H connected together to form a pole piece.

As illustrated in FIGS. 6H and 6I, first and second pole pieces 422A, 422B are each formed from a pair of identical modular half-plate components 421 (with one of the half-plate components 421 being rotated through 180° as illustrated in FIG. 6I). Each half-plate component 421 defines a part 421A of the coil-winding section 424C/first further parallel flux path section 424G and a part 421B of the parallel flux path section 424D/second further parallel flux path section 424G. In this way, the full coil-winding section and parallel flux path sections 424C, 424D of the first pole piece 422A are only formed once the two half-plate components 421 are joined (using, for example, suitable adhesive and additionally magnetically held together in the final assembly due to the permanent magnet flux).

The half-plate construction is significant for the first pole piece 422A since it allows the pair of half-plate components 421 used to form the first pole piece 422A to be installed around preformed first and second electrically conductive coils 426A, 426B to avoid the need to wind the coils around an awkward structure.

Strictly speaking the second pole piece 422B need not share the profile shape of first pole piece 422A, but this modular approach to construction allows the motor/generator 400 to be manufactured from a reduced number of parts.

The first, second, third and fourth limbs 424A, 424B, 424E, 424F (which are identical in size and material choice by virtue of the half-plate construction) are dimensioned to permit full flow of magnetic flux to and from the permanent magnet arrangements 425A, 425B whilst closely approaching (but never fully reaching) magnetic saturation. Each of the coil-winding section 424C, parallel flux path section 424D and first and second further parallel flux path sections 424G and 424G have square cross-sectional profiles along the flux path direction and have identical cross-sectional areas/magnetic saturation capacity. Although a square cross-section is illustrated for the coil-winding section 424C and parallel flux path section 424D, a circular or substantially circular cross-section will provide the possibility of a further reduction in coil length/reduced coil stress but is more complex to manufacture.

As with the previous embodiments, each activatable magnet element 420 has its magnetic flux constrained to its local domain when in the inactive mode and the rotors 430A, 430B do not include any permanent magnets. This means that each of the rotors and the stator of the motor/generator apparatus 400 can be easily and safely assembled in segments and combined to form the final machine with minimal magnetic force to overcome when positioning the activatable magnetic elements. As previously explained, this is hugely significant for high power motor/generator machines where the magnetic forces experienced during coupling of the rotor to the stator can be extreme and present significant load-bearing/safety issues to the assembly plant.

Figure 7:
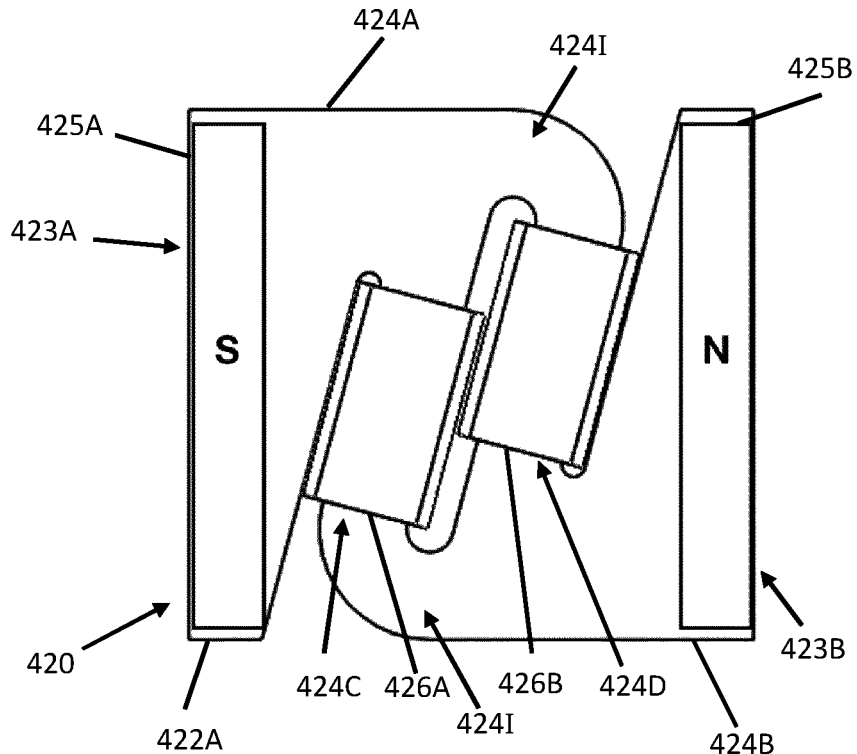
FIG. 7 is a schematic cross-sectional view of the stator part of FIG. 6D.

FIG. 7 shows a schematic representation of the activatable magnet element 420 of the dual-rotor axial field reluctance motor/generator 400 of FIG. 6A with the first and second permanent magnet arrangements 425A, 425B positioned between the first pole piece 422A and the second pole piece 422B in a multilayer arrangement (for simplicity the second pole piece 422B has been omitted so that only the magnets and the first pole piece behind them is visible). As discussed, the second pole piece 422B is identical in profile to the first pole piece 422B by virtue of the module half-plate construction.

Figure 8:
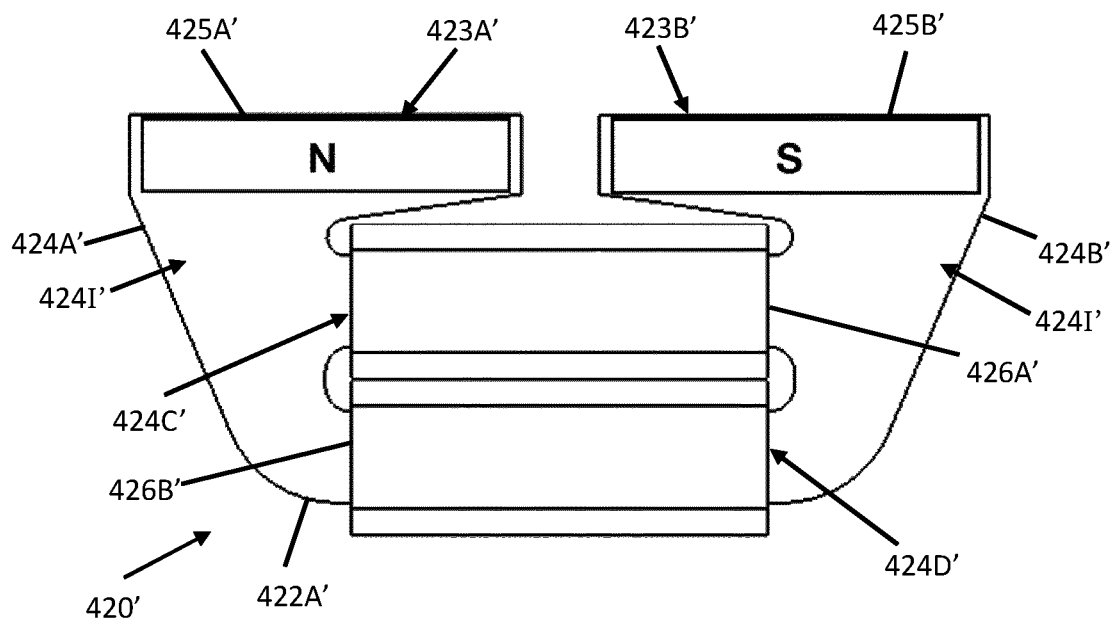
FIG. 8 is a schematic cross-sectional view of an alternative stator part to that shown in FIG. 7 for use in a single-sided axial flux reluctance motor/generator.

FIG. 8 shows an example of how the same dual-plane pole piece construction can be employed in the activatable magnet element 420' of a single-rotor radial field motor/generator (features in common are labelled accordingly). The operation of activatable magnet element 420' is analogous to the operation of the activatable magnet element 420 except that the magnetic flux flow during the active mode of operation is now directed across a single air gap rather than across opposed first and second air gaps.

Figure 9A:
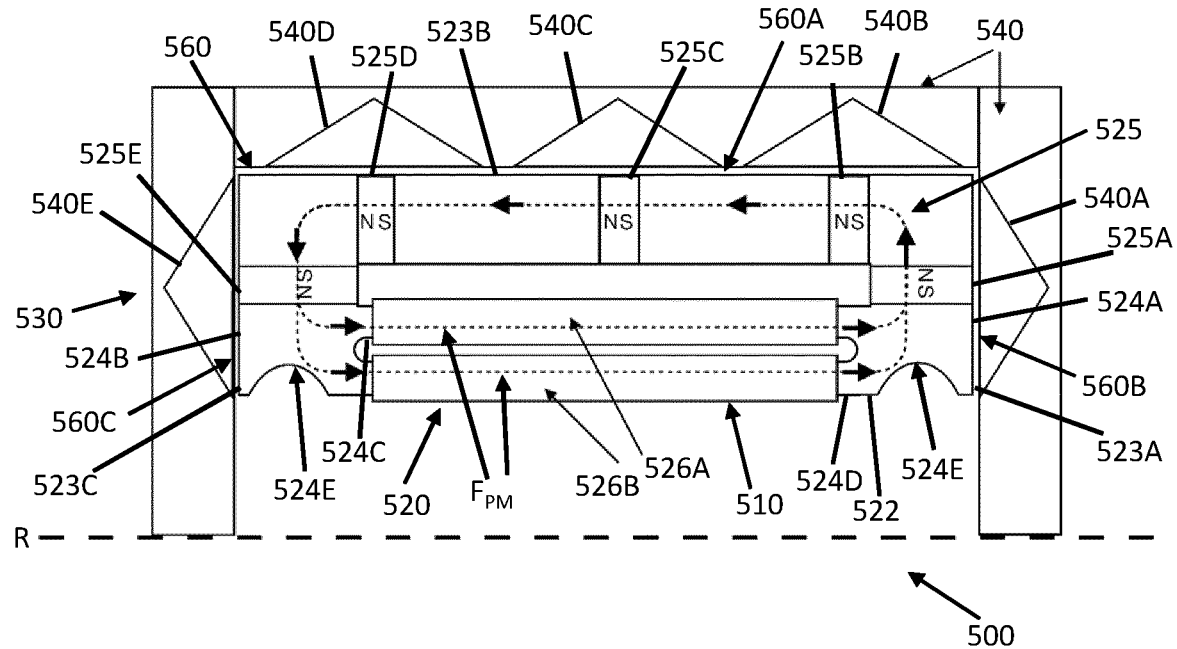
FIG. 9A is a schematic cross-sectional view of rotor/stator parts of a radial flux reluctance motor/generator in accordance with another embodiment of the present invention with the activatable magnet element in a de-energised mode.
Figure 9B:
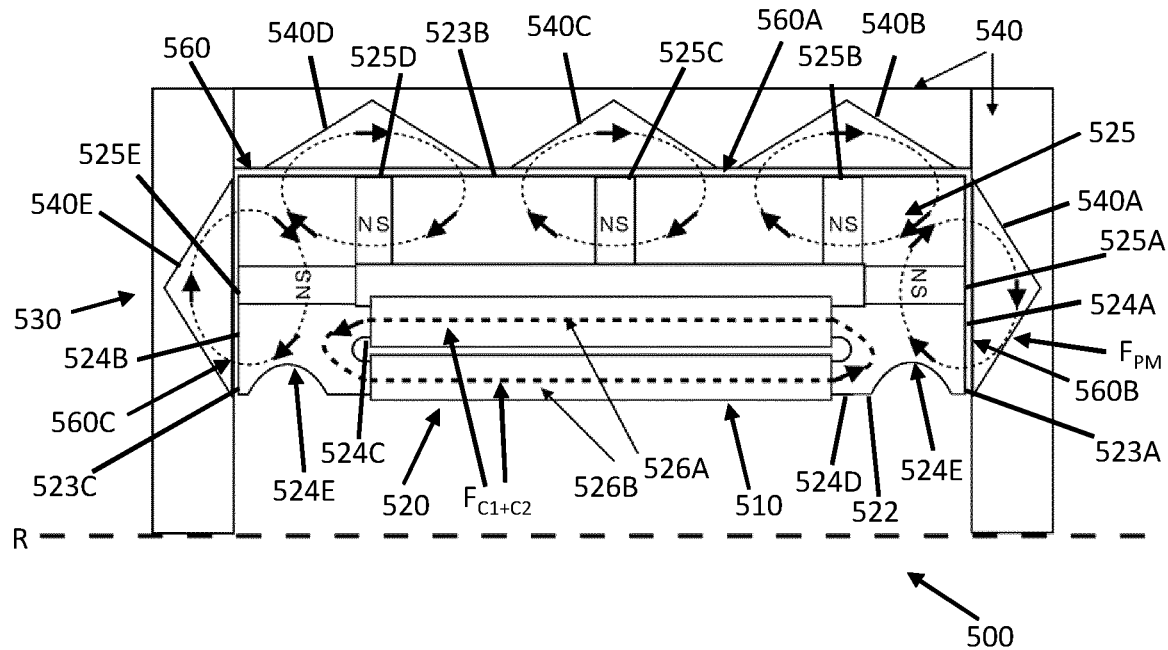
FIG. 9B is a schematic cross-sectional view of the rotor/stator parts of FIG. 9A with the activatable magnet element in an energised mode.

FIGS. 9A and 9B show inactive and active modes respectively an example of a further hybrid axial/radial flux rotary reluctance motor/generator apparatus 500 comprising a stator 510 and a rotor 530 arranged about a rotary axis "R". Rotor 530 is configured to rotate relative to stator 510 about rotary axis "R" and is spaced therefrom by an active air gap 560 extending both axially and radially relative to the rotary axis "R". As illustrated, air gap 560 comprising a central axially extending portion 560A and a pair of opposed outer portions 560B, 560C extending radially and substantially normal to the central axially extending portion 560A.

Stator 510 comprises an annular array of n circumferentially spaced activatable magnet elements 520 and rotor 530 comprises an annular array of p circumferentially spaced magnetic flux guide elements 540 (wherein typically n=p+/-2, 3, 4, 6, 8, 9, 10 or 12 depending upon the require phase operation). For simplicity only a single activatable magnet element and a single magnetic flux guide element are shown.

Each activatable magnet element 520 is operative when activated by application of an electric current thereto to apply direct a magnetic field across the central and opposed outer portions 560A-560C of the air gap to a nearby opposed magnetic flux guide element 540. As illustrated, in this embodiment each magnetic flux guide element 540 comprises plurality of spaced magnetic flux guide regions 540A-540E extending along the air gap 560.

Each activatable magnet element 520 comprises: a high permeability pole piece 522 defining a series of air-gap facing surfaces 523A, 523B, 523C extending along the air gap 560, the pole piece 522 comprising: a first limb 524A; a second limb 524B; a coil-winding section 524C and a parallel flux path section 524D positioned magnetically in parallel between the first and second limbs 524A, 524B; a permanent magnet arrangement 525 comprising a series of spaced permanent magnets 525A, 525B, 525C, 525D, 525E provided between the first and second limbs 524A, 524B and magnetically in parallel to each of the coil-winding section 524C and parallel flux path section 524D; and first and second electrically conductive coils 526A, 526B wound around the coil-winding section 524C and parallel flux path section 524D respectively, wherein the electrically conductive coil 526 is operative to generate a magnetic flux oriented to oppose the magnetic flux of the series of permanent magnets 525A-525E forming the permanent magnet arrangement 525.

As illustrated in FIG. 9A, in an inactive mode of operation the first and second electrically conductive coils 526A, 526B are de-energised and magnetic flux ($F_{PM}$) from the series of permanent magnets 525A-525E forming the permanent magnet arrangement 525 will preferentially flow in parallel through the coil-winding section 524C and parallel flux path section 524D in preference to across the air gap 560.

As illustrated in FIG. 9B, in an active mode of operation the first and second electrically conductive coils 526A, 526B are energised to generate a magnetic flux ($F_{C1+C2}$) to oppose the magnetic flux ($F_{PM}$) of the series of permanent magnets 525A-525E forming the permanent magnet arrangement 525 and the magnetic flux from each of permanent magnets 525A-525E will preferentially flow across the air gap 560 as the reluctance across the air gap 560 is now lower than the path through the pole piece 522 with the opposed coil flux present. The magnetic flux from each individual permanent magnet 525A-525E across the air gap 560 flows through a corresponding one of the plurality of spaced magnetic flux guide regions 540A-540E of the magnetic flux guide element 540 before returning back across air gap 560 to pole piece 522 to complete a localised magnetic circuit.

Advantageously, the use of multiple permanent magnets 525A-525E allows the radial depth of the motor/generator 500 to be reduced relative to an equivalent single magnet solution of the same active magnetic length.

As in previous embodiments, first and second limbs 524A, 524B may each include a flow restriction region 524E of reduced cross-sectional area provided between the permanent magnet arrangement 525 and the coil-winding section/parallel flux path sections 524C, 524D. Since in use pole piece 522 will be operating close to magnetic saturation during the active mode, any magnetic flux attempting to flow along the first limb 524A towards the coil-winding/parallel flux path sections 524C, 524D may lead to magnetic saturation of the restriction region 524E of the first limb 524A and this magnetic saturation will significantly increase the reluctance of the pole piece 522 and encourage preferential magnetic flux flow across the air gap 560.

Figure 10A:
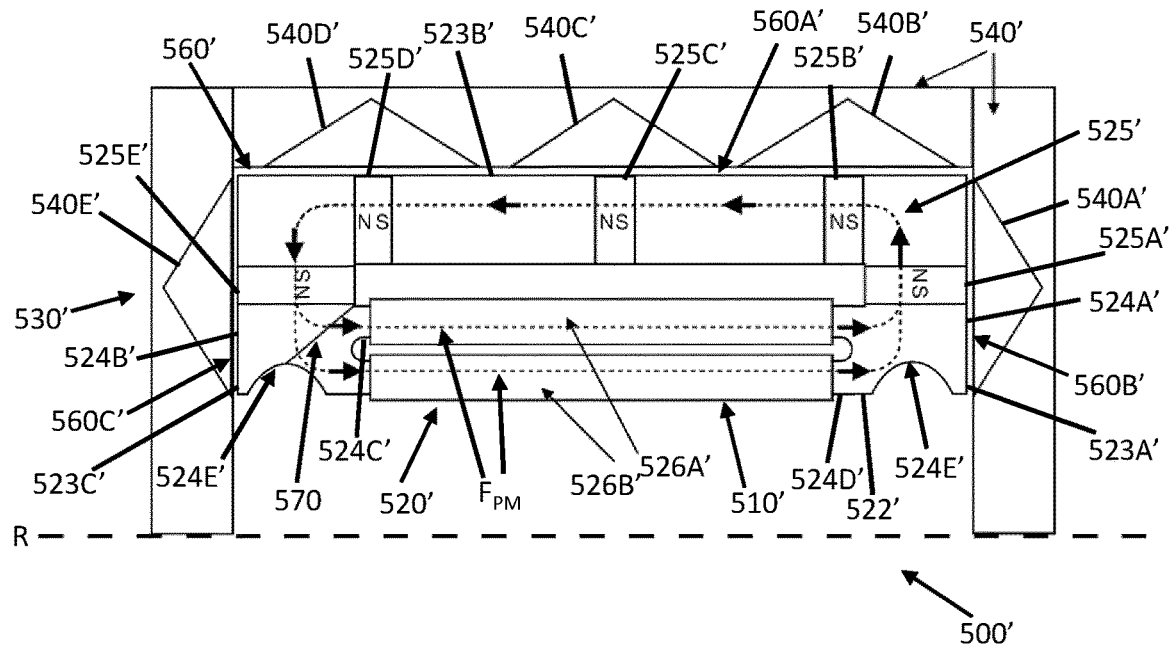
FIG. 10A is a schematic cross-sectional view of rotor/stator parts of a radial flux reluctance motor/generator in accordance with a further embodiment of the present invention with the activatable magnet element in a de-energised mode.
Figure 10B:
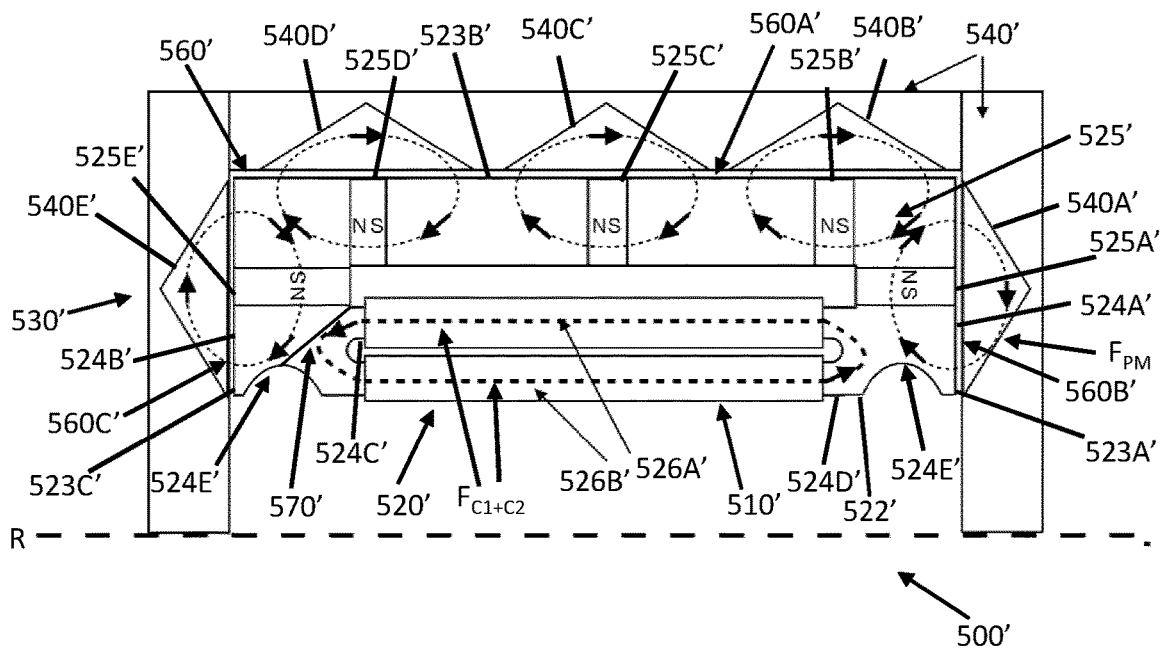
FIG. 10B is a schematic cross-sectional view of the rotor/stator parts of FIG. 10A with the activatable magnet element in an energised mode.

FIGS. 10A and 10B show inactive and active modes respectively of an alternative reluctance motor/generator 500' based on the multi-magnet reluctance motor/generator 500 of FIGS. 9A-9B (features in common are labelled accordingly) with a section of reduced permeability region 570 provided within first limb 524A'. Reduced permeability region 570 has a substantially reduced permeability (e.g.

approximately 1000 times lower than the mean permeability of the pole piece 522' material) and is positioned such that the full flow magnetic flux flowing from the permanent magnets 525A-525E' of the permanent magnet arrangement 525' magnetic to the coil section and parallel flux path section flows through the reduced permeability region 570.

The inclusion of reduced permeability region 570 within the core structure reduces the series sum of permanent magnet mmf seen by the first and second electrically conductive coils 526A', 526B' and thus less coil mmf is need to redirect the magnetic flux of the permanent magnet arrangement 525' to cross the air gap 560'. The longitudinal length of the reduced permeability region 570 along the magnetic flux path may be of the order of the air gap length, for example 1 mm. In the example shown where there are five permanent magnets 525A'-525E', each permanent magnet 525A'-525E' must deal with an effective air gap length of twice the air gap length (magnetic flux must first pass across the air gap to the magnetic flux guide element 540' and then return back across the air gap to the permanent magnet). If the length of the air gap 560' is 1 mm and each permanent magnet 525A'-525E' has adequate mmf to provide the required working flux in the air gap 560', the sum of the permanent magnet mmfs can be seen to be capable of operating over the sum of the air gaps, i.e. 10 mm air gap. Thus, a reduced permeability region 570 with a path length of 0.5-1 mm would introduce between $1/20^{th}$ and $1/10^{th}$ impact of air gap 560'. Thus, very little leakage flux would result in the air gap during the inactive mode and yet the mmf of the first and second electrically conductive coils 526A', 526B' (amp turns and hence heat loss) could be significantly reduced.

Conceivably the reduced permeability region 570 could be provided in the form of an airgap, but for structural reasons a layer of a solid electrically insulative (to avoid formation of eddy currents) is preferable.

Figure 11A:
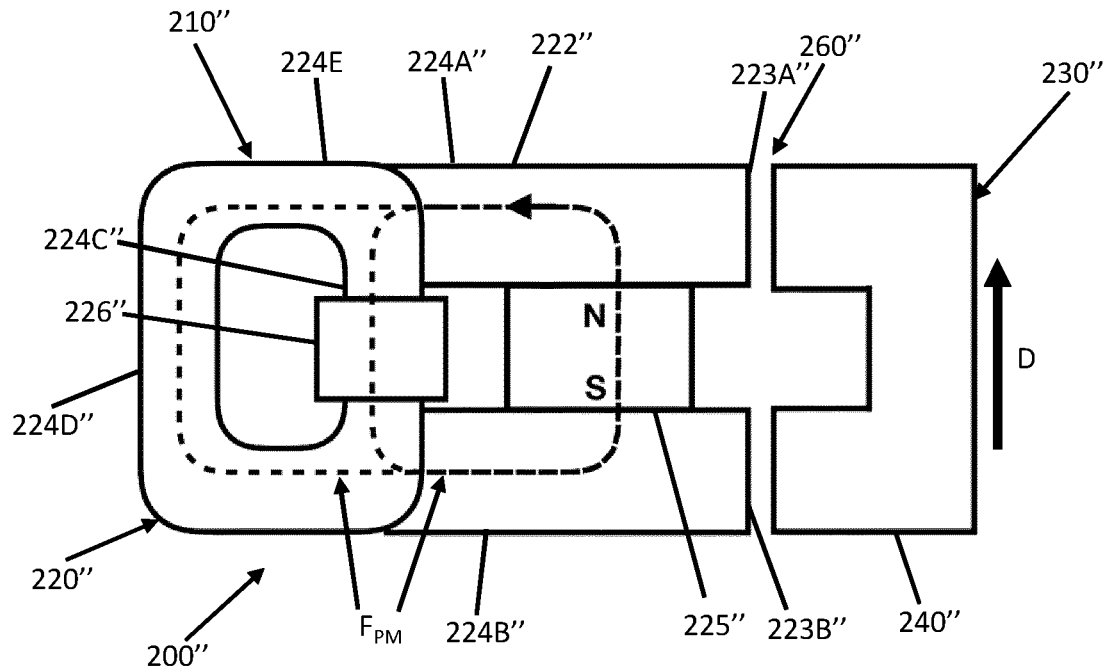
FIG. 11A is a schematic cross-sectional view of rotor/stator parts of a reluctance motor/generator in accordance with a further embodiment of the present invention with the activatable magnet element in a de-energised mode.
Figure 11B:
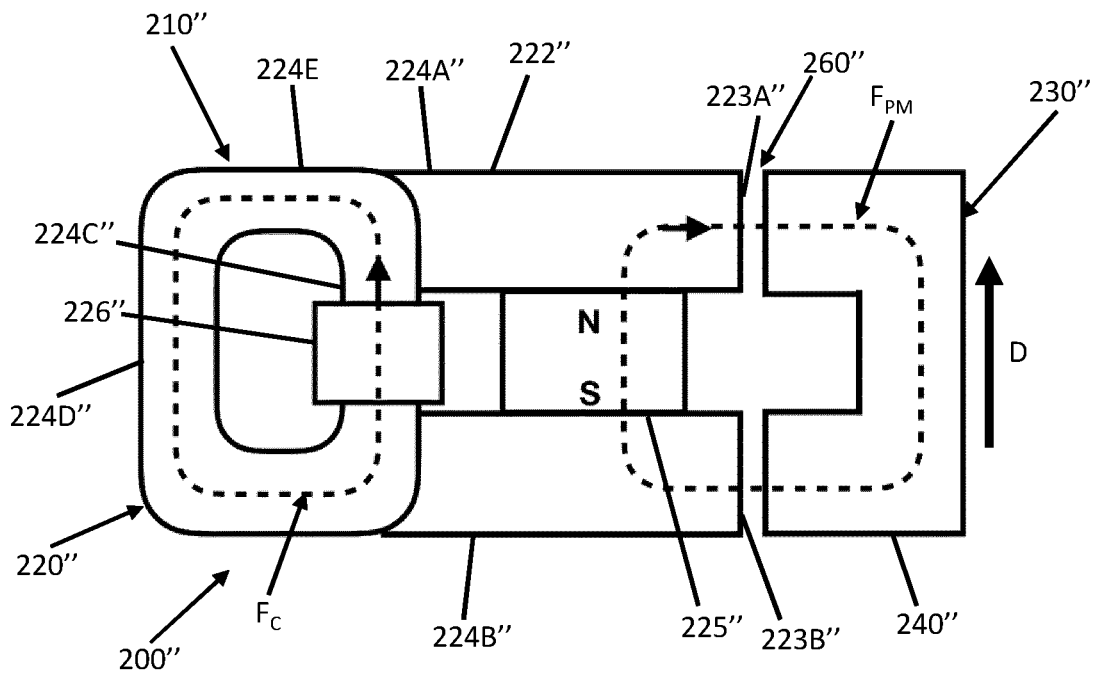
FIG. 11B is a schematic cross-sectional view of the rotor/stator parts of FIG. 11A with the activatable magnet element in an energised mode.

FIGS. 11A and 11B show inactive and active modes respectively of an alternative reluctance motor/generator 200" based on the multi-magnet reluctance motor/generator 200 of FIGS. 2A-2B (features in common are labelled accordingly) in which the first and second limbs 224A", 224B" of the pole piece 222" are formed as separate components for attachment to an annular piece 224E which includes the coil-winding section 224C" and parallel flux path section 224D". This construction has two advantages: 1) it allows aspects of the manufacture of the pole piece 222" to be simplified in a manner that may be more suited to the formation of coil-winding and parallel flux path sections with a circular or substantially circular cross-section; and 2) a layer of bonding material used to join the first and second limbs 224A", 224B" to the annular piece 224E may act as a reduced permeability region 270 comparable with reduced permeability region 570 discussed above. Although only a single permanent magnet is shown in FIGS. 11A and 11B, the skilled reader will readily understand that this single permanent magnet may be replaced by a series of permanent magnets extending along the air gap 260" (e.g. as illustrated in FIGS. 10A and 10B).

Typically in all of the embodiments of the present invention the pole piece and magnetic flux guide element are formed from high permeability materials ("soft magnetic" materials) presenting a substantially lower reluctance to the permanent magnet arrangement than the reluctance of the air gap.

A range of high permeability values is available depending upon the material choice. Silicon steel is in the order of 3000 relative permeability; nickel alloys can be in the order of 10,000 or more, ferrite (a ceramic form of iron) is of the order of 500-2000; cobalt iron 15,000+.

Powdered iron materials are today of the order of 500-1000 and being improved.

In addition to the permeability, these materials also have a maximum level of flux they can carry before becoming saturated (i.e. saturation level capacity, "S"). This parameter determines the cross sectional area needed to convey a quantity of flux. So flux density (i.e. flux per unit area) is an important parameter—for ferrite this parameter is 0.4 Tesla; for silicon steel this value is 1.6 Tesla, for cobalt iron 2.4 Tesla.

Thus the ideal material is one that has permeability in the order of many thousands, whilst having a saturation level of several Tesla.

The larger the saturation value the smaller the cross section for a given flux and the shorter the length of a coil wire turn.

The larger the permeability the lower the number of coil turns required to achieve a specific mmf level.

It is well known that performance of magnetic machines is improved by the reduction of eddy currents. This is most typically achieved by the use of laminated steel cores to support coil systems.

Laminations are either bonded, welded or riveted together to form a three-dimensional component. Each lamination is electrically insulated from the neighbouring laminations by a thin insulating coating on each surface. A few microns insulation for example some oxides or lately polymers are employed. A bonded assembly has the advantage of not risking any other path for the eddy currents to find—a risk with welding and riveting as these methods provide a conductive path.

Another method to minimise eddy current losses is the use of powdered soft magnetic materials. Soft magnetic materials refer to those materials that facilitate the flow of magnetic flux without themselves becoming permanently magnetised.

The powder materials can include iron, steel, nickel, cobalt in varying quantities. Particles are thinly oxidised or coated and then compacted to form a rigid three-dimensional component that allows magnetic flux to flow within in any direction (anisotropic), whereas a lamination by its nature is essentially a two-dimensional element stacked to provide three-dimensional form. The use of power materials may be advantageous in the dual-plane pole piece arrangements of FIGS. 6A-I and FIG. 8 since the magnetic flux flow through the pole piece is required to flow both across and through the pole pieces 422A, 422A'.

The invention claimed is:

1. Apparatus for use as a motor or generator, comprising:
   a first part;
   a second part movable relative to the first part and spaced from the first part by an air gap; and
   a plurality of spaced activatable magnet elements provided on the first part, each activatable magnet element being operative when activated by application of an electric current thereto to direct a magnetic field across the air gap towards the second part;
   wherein each activatable magnet element comprises:
      a pole piece defining an air-gap facing surface, the pole piece comprising:
         a first limb;
         a second limb; and
         a coil-winding section positioned between the first and second limbs;

a permanent magnet arrangement provided between the first and second limbs of the pole piece; and an electrically conductive coil wound around the coil-winding section of the pole piece, wherein the electrically conductive coil is operative to generate a magnetic flux oriented to oppose the magnetic flux of the permanent magnet arrangement;

wherein the pole piece further comprises a parallel flux path section extending in parallel to the coil-winding section operative to allow magnetic flux from the permanent magnet arrangement to flow in parallel to the coil-winding section; and control circuitry operative to control current supply to the electrically conductive coils of the plurality of activatable magnet elements;

wherein:

in an inactive mode of operation, the electrically conductive coil is configured to be de-energized and magnetic flux from the permanent magnet arrangement preferentially flows in parallel through the coil-winding section and parallel flux path section in preference to across the air gap; and in an active mode of operation, the electrically conductive coil is configured to be energized to generate a magnetic flux to oppose the magnetic flux of the permanent magnet arrangement and the magnetic flux from the permanent magnet arrangement preferentially flows across the air gap.

2. Apparatus according to claim 1, wherein the coil-winding section is positioned between the permanent magnet arrangement and the parallel flux path section.

3. Apparatus according to claim 1, wherein the parallel flux path section comprises a further coil-winding section and the activatable magnet element further comprises a further electrically conductive coil wound around the further coil-winding section.

4. Apparatus according to claim 1, wherein, the pole piece has a flux flow restriction region operative to control the flow of magnetic flux from the permanent magnet arrangement to the coil-winding section/parallel flux path section during the inactive mode of operation.

5. Apparatus according to claim 4, wherein the pole piece comprises at least one reduced permeability region, the reduced permeability region having a substantially reduced permeability relative to an average permeability of the pole piece, wherein the at least one reduced permeability region is positioned such that magnetic flux flowing from the permanent magnet arrangement to the coil-winding section during the inactive mode of operation flows through the at least one reduced permeability region.

6. Apparatus according to claim 5, wherein the reduced permeability region is configured to receive substantially the full flow of magnetic flux flowing from the permanent magnet arrangement to the coil winding section during the inactive mode of operation.

7. Apparatus according to claim 5, wherein the reduced permeability region is electrically insulative.

8. Apparatus according to claim 1, wherein:
the first limb defines a first air-gap facing surface;
the second limb defines a second air-gap facing surface; and
the permanent magnet arrangement defines a third air-gap facing surface.

9. Apparatus according to claim 1, wherein the air gap is a single air gap and the first and second limbs define first and second magnetic flux paths respectively each extending from the coil-winding section towards the single air gap.

10. Apparatus according to claim 8, wherein:
the first part is positioned between first and second opposed faces of the second part; and
the air gap comprises:
a first air-gap section separating a first side of the first part from the first face of the second part; and
a second air-gap section separating a second side of the first part from the second face of the second part;
wherein the first limb defines a first magnetic flux path extending from the coil-winding section towards the first air-gap section and the second limb defines a second magnetic flux path extending from the coil-winding section towards the second air-gap section.

11. Apparatus according to claim 10, wherein the first and third air-gap facing surfaces face the first air gap section and the second air-gap facing surface faces the second air gap section, the first air-gap facing surface being substantially opposed to the second air-gap facing surface.

12. Apparatus according to claim 1, wherein the pole piece of each activatable magnet element comprises a further permanent magnet arrangement provided between the first and second limbs, the further permanent magnet arrangement being orientated to form a magnetic circuit with the first-defined permanent magnet arrangement when the electrically conductive coil is inoperative during the inactive mode.

13. Apparatus according to claim 12, wherein each activatable magnet element comprises a further pole piece connecting the first-defined and further permanent magnet arrangements in parallel to the first-defined pole piece.

14. Apparatus according to claim 13, wherein the further pole piece comprises:
a third limb;
a fourth limb;
a connecting section extending between the third and fourth limbs.

15. Apparatus according to claim 14, wherein the further pole piece further comprises a further parallel flux path section providing a flux path in parallel to the connecting section.

16. Apparatus according to claim 14, wherein the connecting section supports a supplementary electrically conductive coil.

17. Apparatus according to claim 15, wherein the further parallel flux path section supports a further supplementary electrically conductive coil.

18. Apparatus according to claim 1, wherein the permanent magnet arrangement comprises a single permanent magnet.

19. Apparatus according to claim 1, wherein the permanent magnet arrangement comprises a plurality of mutually spaced permanent magnets.

20. Apparatus according to claim 1, wherein the pole piece comprises a plurality of subparts connected together.

21. Apparatus according to claim 20, wherein the plurality of subparts comprise a first subpart defining at least a first part of the coil-winding section and a second subpart, wherein the first and second subparts are configured to be installed around a preformed electrically conductive coil.

* * * * *